United States Patent
Cierniak et al.

(10) Patent No.: US 8,745,067 B2
(45) Date of Patent: Jun. 3, 2014

(54) PRESENTING COMMENTS FROM VARIOUS SOURCES

(75) Inventors: Michal Cierniak, Palo Altos, CA (US); Donn Denman, Los Gatos, CA (US); Tony Hsieh, Cupertino, CA (US); Derek Prothro, San Francisco, CA (US); Marc Pawliger, San Jose, CA (US)

(73) Assignee: Google Inc., Mountain View, CA (US)

( * ) Notice: Subject to any disclaimer, the term of this patent is extended or adjusted under 35 U.S.C. 154(b) by 435 days.

(21) Appl. No.: 12/539,864

(22) Filed: Aug. 12, 2009

(65) Prior Publication Data
US 2011/0040787 A1 Feb. 17, 2011

(51) Int. Cl.
*G06F 7/00* (2006.01)
*G06F 17/30* (2006.01)

(52) U.S. Cl.
USPC .......................................... 707/749; 715/232

(58) Field of Classification Search
None
See application file for complete search history.

(56) References Cited

U.S. PATENT DOCUMENTS

| | | | | |
|---|---|---|---|---|
| 5,146,552 A * | 9/1992 | Cassorla et al. | ............... | 715/234 |
| 5,671,428 A * | 9/1997 | Muranaga et al. | ............. | 715/751 |
| 6,088,709 A * | 7/2000 | Watanabe | ..................... | 715/233 |
| 6,115,455 A * | 9/2000 | Picard | ........................... | 379/67.1 |
| 6,178,431 B1 * | 1/2001 | Douglas | ........................ | 715/205 |
| 6,519,603 B1 * | 2/2003 | Bays et al. | ............................. | 1/1 |
| 6,578,025 B1 * | 6/2003 | Pollack et al. | ......................... | 1/1 |
| 6,721,921 B1 * | 4/2004 | Altman | ........................ | 715/210 |
| 7,424,682 B1 * | 9/2008 | Pupius et al. | ................. | 715/758 |
| 8,301,631 B2 * | 10/2012 | Chow | ........................... | 707/738 |
| 2001/0051330 A1 * | 12/2001 | Futakuchi | ..................... | 434/322 |
| 2002/0019827 A1 * | 2/2002 | Shiman et al. | ................ | 707/200 |
| 2002/0103867 A1 * | 8/2002 | Schilter | ......................... | 709/206 |
| 2002/0129057 A1 * | 9/2002 | Spielberg | ...................... | 707/512 |
| 2003/0018632 A1 * | 1/2003 | Bays et al. | ........................ | 707/3 |
| 2003/0041112 A1 * | 2/2003 | Tada et al. | ..................... | 709/206 |
| 2003/0135555 A1 * | 7/2003 | Birrel et al. | .................... | 709/206 |
| 2003/0135605 A1 * | 7/2003 | Pendakur | ..................... | 709/224 |
| 2004/0015505 A1 * | 1/2004 | Quick et al. | .................. | 707/100 |
| 2004/0064512 A1 * | 4/2004 | Arora et al. | ................... | 709/206 |
| 2004/0117434 A1 * | 6/2004 | Bantz et al. | ................... | 709/201 |
| 2004/0122912 A1 * | 6/2004 | Kim et al. | ..................... | 709/217 |
| 2004/0205542 A1 * | 10/2004 | Bargeron et al. | ............. | 715/512 |

(Continued)

FOREIGN PATENT DOCUMENTS

WO  WO 2005098600 A2 * 10/2005

OTHER PUBLICATIONS

Using Ontologies to Strengthen Folksonomies and Enrich Information Retrieval in Weblogs, Passant et al., ICWSM, 2007.*

(Continued)

*Primary Examiner* — Augustine K Obisesan
(74) *Attorney, Agent, or Firm* — Harrity & Harrity, LLP

(57) ABSTRACT

A system may include one or more databases to store comments relating to documents, the comments originating from first and second sources, where the comments from the first source include comments received from users via commenting functionality associated with browsers installed on client devices, and the comments from the second source include comments received from users independent of the commenting functionality associated with the browsers installed on the client devices. The system may also include one or more server devices to receive a request for comments relating to a particular document, search at least one of the one or more databases to identify comments relating to the particular document, and provide the identified comments for presentation in connection with the particular document.

21 Claims, 15 Drawing Sheets

(56) References Cited

U.S. PATENT DOCUMENTS

| | | | |
|---|---|---|---|
| 2004/0210833 A1* | 10/2004 | Lerner et al. | 715/512 |
| 2004/0216032 A1* | 10/2004 | Amitay et al. | 715/500 |
| 2004/0260679 A1* | 12/2004 | Best et al. | 707/3 |
| 2004/0261016 A1* | 12/2004 | Glass et al. | 715/512 |
| 2005/0132281 A1 | 6/2005 | Pan et al. | |
| 2005/0160355 A1* | 7/2005 | Cragun et al. | 715/512 |
| 2005/0165778 A1* | 7/2005 | Obata et al. | 707/5 |
| 2005/0216454 A1* | 9/2005 | Diab et al. | 707/3 |
| 2005/0223061 A1* | 10/2005 | Auerbach et al. | 709/206 |
| 2005/0223067 A1* | 10/2005 | Buchheit et al. | 709/206 |
| 2005/0256866 A1* | 11/2005 | Lu et al. | 707/5 |
| 2005/0256867 A1* | 11/2005 | Walther et al. | 707/5 |
| 2005/0262203 A1* | 11/2005 | Buchheit et al. | 709/206 |
| 2006/0015811 A1* | 1/2006 | Tanaka et al. | 715/531 |
| 2006/0020882 A1* | 1/2006 | Beezer et al. | 715/512 |
| 2006/0031340 A1* | 2/2006 | Mathew et al. | 709/206 |
| 2006/0080598 A1* | 4/2006 | Bargeron et al. | 715/512 |
| 2006/0123087 A1* | 6/2006 | Gibson | 709/206 |
| 2006/0143559 A1* | 6/2006 | Spielberg et al. | 715/512 |
| 2006/0161578 A1* | 7/2006 | Siegel et al. | 707/102 |
| 2006/0184522 A1* | 8/2006 | McFarland et al. | 707/5 |
| 2006/0277523 A1* | 12/2006 | Horen et al. | 717/106 |
| 2007/0016648 A1* | 1/2007 | Higgins | 709/206 |
| 2007/0055926 A1* | 3/2007 | Christiansen et al. | 715/512 |
| 2007/0061296 A1 | 3/2007 | Burke et al. | |
| 2007/0067399 A1* | 3/2007 | Kulkarni et al. | 709/206 |
| 2007/0143694 A1 | 6/2007 | Rakowski et al. | |
| 2007/0174762 A1* | 7/2007 | Plant | 715/512 |
| 2007/0179945 A1* | 8/2007 | Marston et al. | 707/5 |
| 2008/0005064 A1* | 1/2008 | Sarukkai | 707/3 |
| 2008/0016098 A1* | 1/2008 | Frieden et al. | 707/102 |
| 2008/0126303 A1* | 5/2008 | Park et al. | 707/3 |
| 2008/0133488 A1* | 6/2008 | Bandaru et al. | 707/3 |
| 2008/0177755 A1* | 7/2008 | Stern et al. | 707/100 |
| 2008/0195602 A1* | 8/2008 | Keller et al. | 707/5 |
| 2008/0195657 A1* | 8/2008 | Naaman et al. | 707/104.1 |
| 2008/0201632 A1* | 8/2008 | Hong et al. | 715/230 |
| 2008/0208790 A1* | 8/2008 | Oshima et al. | 707/1 |
| 2009/0217148 A1* | 8/2009 | Harter, Jr. | 715/230 |
| 2010/0011282 A1* | 1/2010 | Dollard et al. | 715/233 |

OTHER PUBLICATIONS

Identifying Commented Passages of a Document Using Implicit Hyperlinks, Delort et al, HT, pp. 89-98, 2006.*

Key Blog Distillation: Ranking Aggregates, Macdonald et al, CIKM, pp. 1043-1052, 2008.*

Comments-Oriented Blog Summarization by Sentence Extraction, Hu et al., pp. 901-904, 2007.*

Blog Mining in Corporate Environment, Tu et al, ASGAARD-TR-2005-11, 2005.*

Using Blog Properties to Improve Retrieval, Mishne et al, ICWSM, 2007.*

Expressing Social Relationship on the Blog through Links and Comments, Ali-Hasan et al, Conference on Weblogs and Social Media, 2007.*

Notification of Transmittal of the International Search report and the Written Opinion of the International Searching Authority, or the Declaration corresponding to PCT/US2010/045066, mailed Feb. 25, 2011, 9 pages.

* cited by examiner

PRESENTING COMMENTS FROM VARIOUS SOURCES

BACKGROUND

Many techniques are available to users today to find information on the world wide web ("web"). For example, users often use web browsers and/or search engines to find information of interest.

A user may enter a search query into a search box of a browser and the browser may submit the search query to a search engine. The search engine may identify documents that match the search query, rank the documents based on various factors, and return a ranked list of documents to the user. The user may select a document from the list and request the document. A browser may retrieve the requested document and display the document to the user in a browser window.

However, the amount of information that is available to users on the web can be overwhelming. It is a difficult task to present users with information in which the users are interested.

SUMMARY

According to one implementation, a method, performed by one or more server devices, may include providing a plurality of databases, associated with the one or more server devices, that store comments of different types, where each of the databases may store a respective one or more of the different types of comments, and where each of the comments may relate to a document in a group of documents. The method may further include receiving, via a processor of the one or more server devices and from a client device, a request for comments relating to a particular document; searching, using a processor of the one or more server devices, one or more of the databases to identify comments relating to the particular document; and providing, using a processor of the one or more server devices, the identified comments to the client device for presentation in connection with the particular document.

According to another implementation, a system may include a first database to store comments relating to documents, where the comments in the first database may originate from a first source; a second database to store comments relating to documents, where the comments in the second database may originate from a second source, where the first source is different from the second source; and one or more server devices. The one or more server devices may include means for receiving, from a client device, a request for comments relating to a particular document, means for searching at least one of the first database or the second database to identify comments relating to the particular document, and means for providing, to the client device, the identified comments for presentation in connection with the particular document.

According to a further implementation, a system may include a first database to store comments relating to documents; a second database to store blog posts; and one or more devices to: analyze a group of the blog posts to identify the documents to which the blog posts relate, store the group of blog posts, as comments, in the first database in association with the documents to which the blog posts relate, receive, from a client device, a request for comments relating to a particular document, search the first database to identify comments relating to the particular document, and present, to the client device, the identified comments for presentation in connection with the particular document.

According to another implementation, a system may include one or more databases to store comments relating to documents. The comments may originate from first and second sources, where the comments from the first source may include comments received from users via commenting functionality associated with browsers installed on client devices, and the comments from the second source may include comments obtained independent of the commenting functionality associated with the browsers installed on the client devices. The system may also include one or more server devices to receive a request for comments relating to a particular document, search at least one of the one or more databases to identify comments relating to the particular document, and provide the identified comments for presentation in connection with the particular document.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

For some documents, users might like to see comments regarding these documents. A "comment," as used herein, may include text (e.g., styled or markup text, such as Hyper-Text Markup Language (HTML)), audio data, video data, and/or image data that provides an opinion of, or otherwise remarks upon, the contents of a document or a portion of a document. One example of a comment may include a document whose sole purpose is to contain the opinion/remark. Another example of a comment may include a blog post. Yet another example of a comment may include a web page or a news article that remarks upon an item (e.g., a product, a service, a company, a web site, a person, a geographic location, or something else that can be remarked upon). A further example of a comment may include a comment that remarks upon another comment.

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 1:
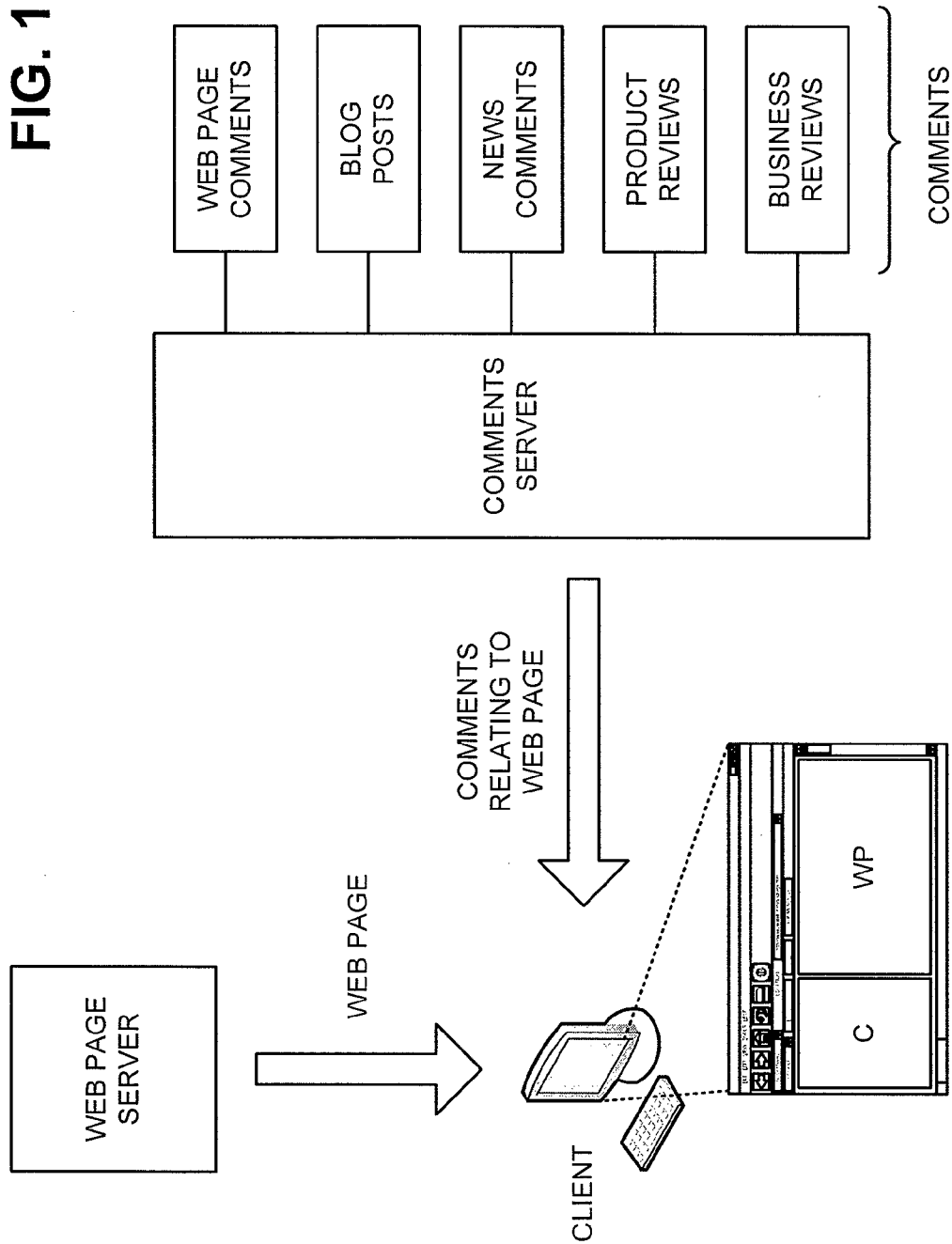
FIG. 1 is a diagram illustrating an overview of an exemplary implementation described herein.

FIG. 1 is a diagram illustrating an overview of an exemplary implementation described herein. A server (shown as "comments server" in FIG. 1) may collect various types of comments. These comments may include, as shown in FIG. 1, web page comments, blog posts, news comments, product reviews, and business reviews. A web page comment may include a user's remark(s) and/or opinion(s) regarding web page information, such as a topic of all or a portion of that web page, an author or owner of that web page, another comment regarding that web page, or the like. A blog post may include a user's remark(s) and/or opinion(s) contained within a blog. The topic of a blog post may relate to any of various topics, such as a web page, a product, a business, a movie, the contents of another blog post of the blog, an author of the blog or a blog post, or the like. A news comment may include a user's remark(s) and/or opinion(s) regarding a news item, such as a news topic, a news article, a provider of the news article (e.g., publisher, author, etc.), another news comment associated with the news item, an author of the other news comment, or the like. A product review may include a user's remark(s) and/or opinion(s) regarding a particular product, such as a feature of the product, a reliability of the product, a provider of the product (e.g., seller, manufacturer, etc.), or the like. A business review may include a user's remark(s) and/or opinion(s) regarding a particular business, such as operations of the business, service(s) provided by the business, product (s) provided by the business, trustworthiness of the business, or the like.

Assume that a client requests access to a web page about a particular topic. The client may send a request for that web page to a web page server that hosts the web page and a request for comments, regarding that web page, to the comments server. In response to the request for the web page, the web page server may provide the web page to the client. In response to the request for comments regarding the web page, the comments server may identify comments relating to that web page and provide the comments to the client. The client may process the web page and comments and, for example, present the web page (WP) and comments (C) together on a display, as shown in FIG. 1.

In the description to follow, certain types of comments will be described (e.g., web page comments, blog posts, news comments, product reviews, and business reviews). The description is not limited to these types of comments and may equally apply to other types of comments, such as movie reviews, food or recipe reviews, etc.

Exemplary Environment

Figure 2:
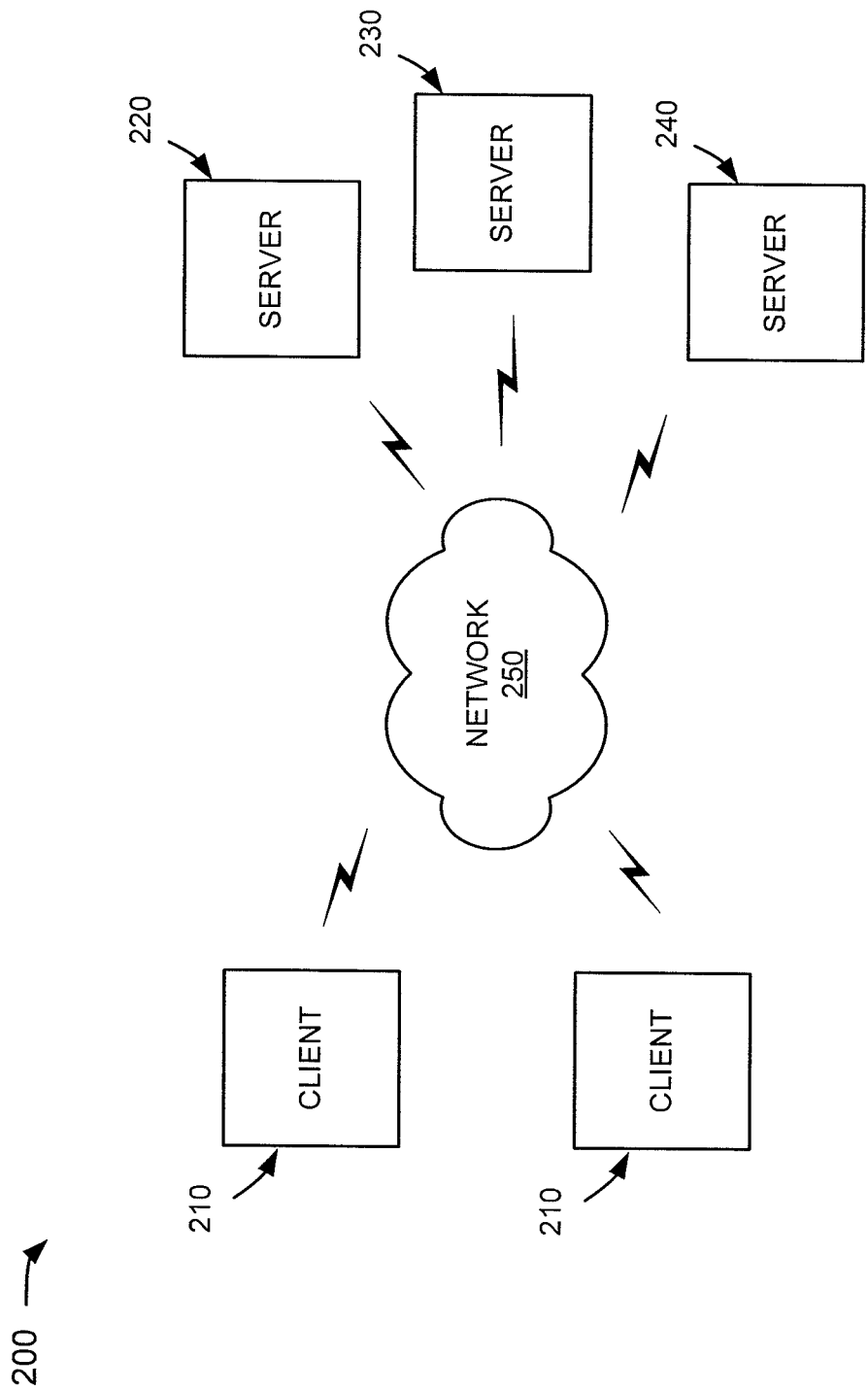
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executed by one of these devices. In one implementation, a client 210 may include a browser application that permits documents to be searched and/or accessed. Client 210 may also include software, such as a plug-in, an applet, a dynamic link library (DLL), or another executable object or process, that may operate in conjunction with (or be integrated into) the browser to obtain and display comments. Client 210 may obtain the software from server 220 or from a third party, such as a third party server, disk, tape, network, CD-ROM, etc. Alternatively, the software may be pre-installed on client 210. For the description to follow, the software will be described as integrated into the browser.

In one implementation, as described herein, the browser may provide a commenting function. The commenting function may permit a user to generate a comment regarding a document, permit the user to view a comment that was previously generated by the user or by other users, and/or permit the user to remove a comment from presentation via the browser (e.g., hide the comment from view). The commenting function may be turned on and off by the user.

Servers 220-240 may include server entities that gather, process, search, and/or maintain documents in a manner described herein. In one implementation, server 220 may gather, process, and/or maintain comments that are associated with particular documents. Servers 230 and 240 may store or maintain comments and/or documents.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include any type of network, such as a local area network (LAN), a wide area network (WAN), a telephone network (e.g., the Public Switched Telephone Network (PSTN) or a cellular network), an intranet, the Internet, or a combination of networks. Clients 210 and servers 220-240 may connect to network 250 via wired and/or wireless connections.

Exemplary Components of Client and/or Server

Figure 3:
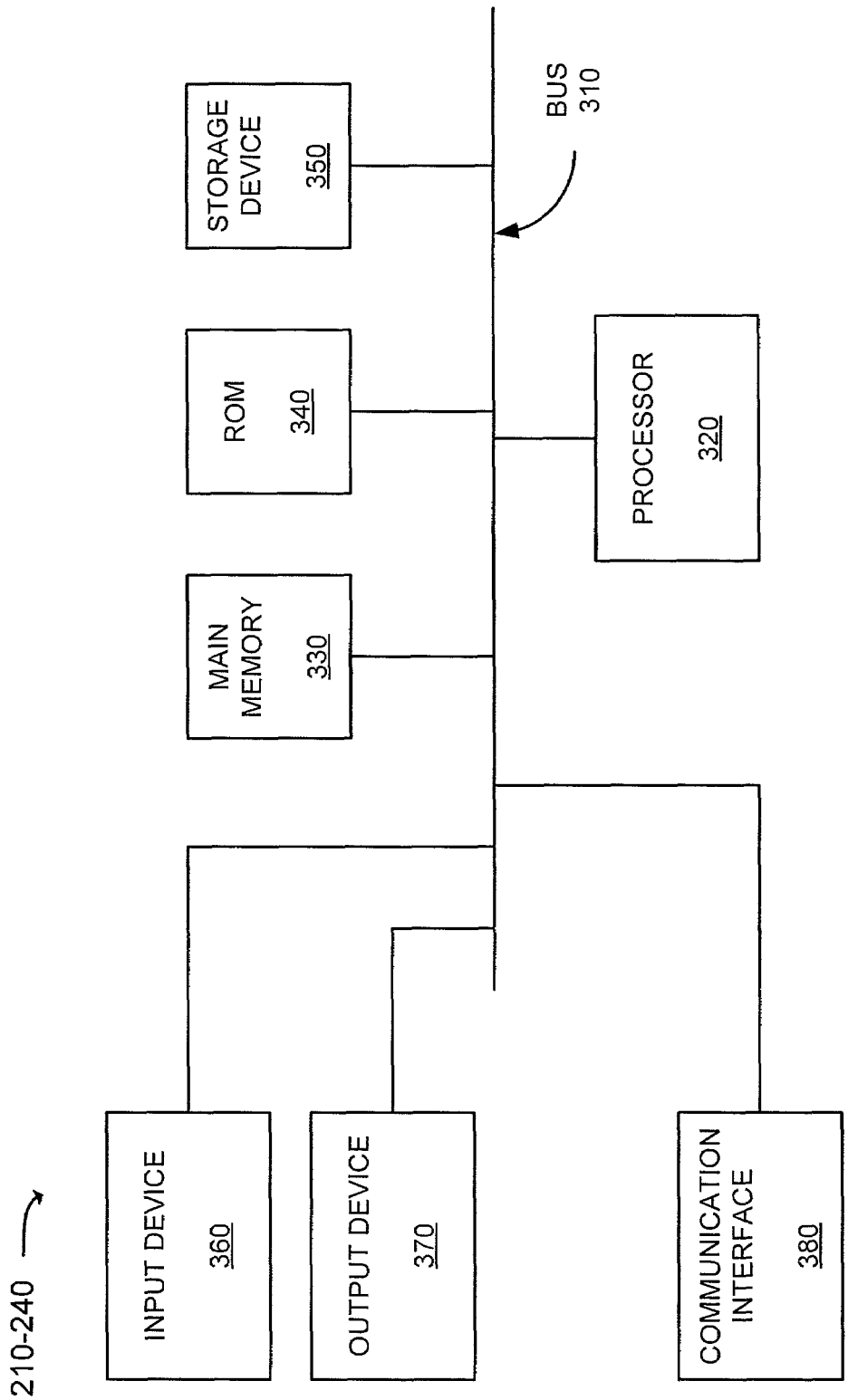
FIG. 3 is a diagram of exemplary components of a client or a server of FIG. 2.

FIG. 3 is a diagram of exemplary components of a client or server entity (hereinafter called "client/server entity"), which may correspond to one or more of clients 210 and/or servers 220-240. As shown in FIG. 3, the client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain operations relating to the processing of comments. The client/server entity may perform these operations in response to processor 320 executing software instructions contained in a computer-readable medium, such as memory 330. A computer-readable medium may be defined as a logical or physical memory device. A logical memory device may include a space within a single physical memory device or spread across multiple physical memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Exemplary Functional Components of Server

Figure 4:
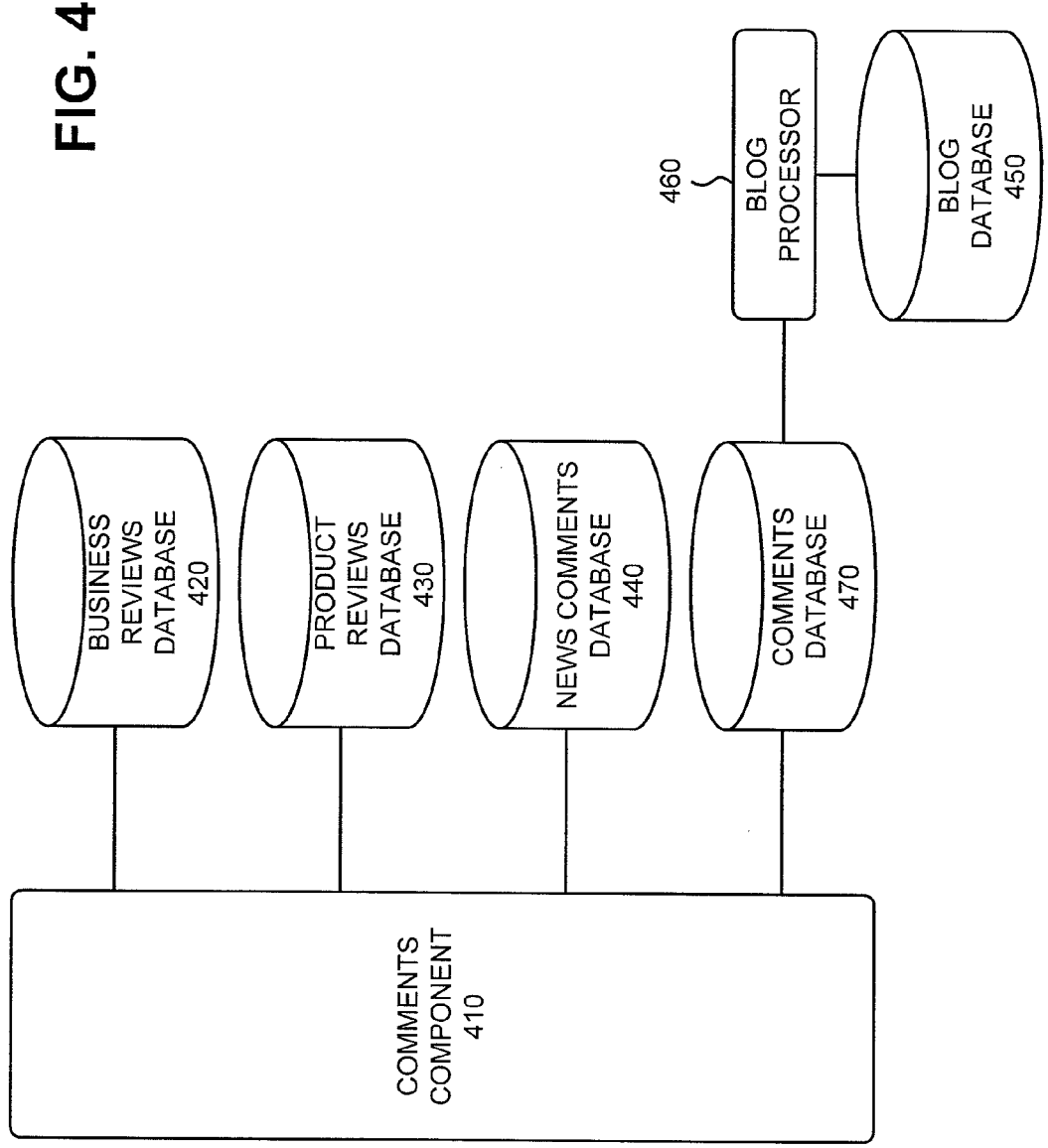
FIG. 4 is a diagram of functional components of the server of FIG. 2.

FIG. 4 is a diagram of exemplary functional components of server 220. In one implementation, the functional components of server 220 may be implemented by one or more hardware elements of server 220, or by one or more software elements in combination with one or more hardware elements of server 220.

As shown in FIG. 4, server 220 may include a comments component 410, a business reviews database 420, a product reviews database 430, a news comments database 440, a blog database 450, a blog processor 460, and a comments database 470. While a particular number and arrangement of components are shown in FIG. 4 as being associated with server 220, in practice, there may be more or fewer components. For example, there may be additional databases that may store comments relating to a particular context or category. Additionally, or alternatively, one or more of the components shown in FIG. 4 may be located external to and accessible by server 220. For example, one or more of databases 420-450 and/or 470 may be located external to and accessible by server 220. Additionally, or alternatively, one or more of databases 420-450 and/or 470 may be combined into a single database. Additionally, or alternatively, blog processor 460 may be located external to, and operate in cooperation with, server 220.

Comments component 410 may interact with clients 210 to obtain and/or serve comments. For example, a user of a client 210 may access a particular document and generate a comment regarding all or a portion of the document. Client 210 may send the comment to comments component 410.

Comments component 410 may receive the comment provided by a client 210 in connection with the particular document. Comments component 410 may gather certain information regarding the comment, such as information regarding the author of the comment, a timestamp that indicates a date and/or time at which comment was created, the content of the comment, and/or a document identifier associated with the document, such as an address (e.g., a uniform resource locator (URL)) of the document. Comments component 410 may receive at least some of this information from client 210. Comments component 410 may store the information regarding the comment in comments database 470.

Comments component 410 may also serve a comment in connection with a document accessed by a client 210. In one implementation, comments component 410 may obtain a comment from business reviews database 420, product reviews database 430, news comments database 440, blog database 450, and/or comments database 470 and provide that comment to client 210 when client 210 accesses a document with which that comment is associated in one or more of these databases.

Figure 5:
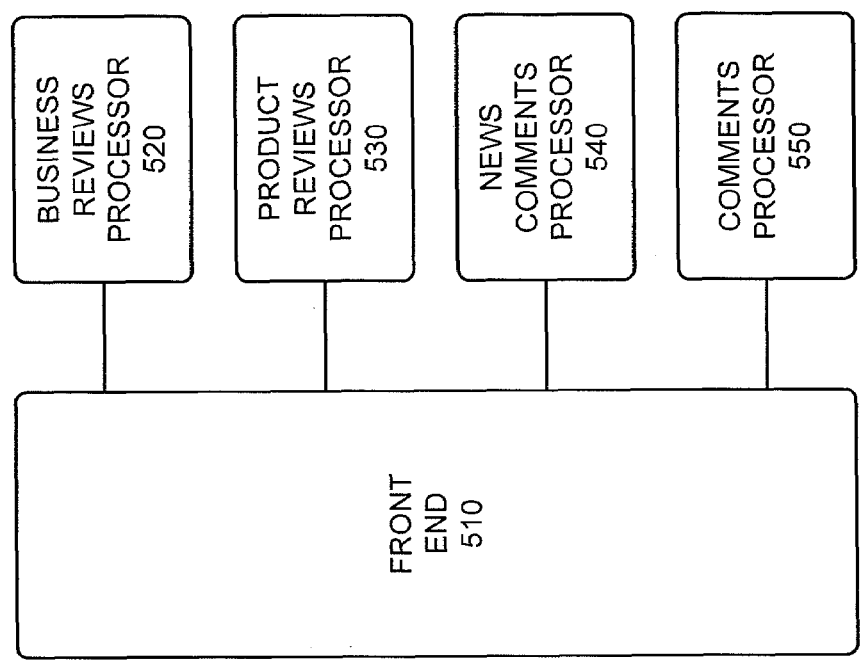
FIG. 5 is a diagram of functional components of the comments component of FIG. 4.

FIG. 5 is a diagram of functional components of comments component 410. As shown in FIG. 5, comments component 410 may include front end 510, business reviews processor 520, product reviews processor 530, news comments processor 540, and comments processor 550. In another implementation, comments component 410 may include fewer or additional functional components.

Front end 510 may interact with clients 210. For example, front end 510 may receive requests for comments from clients 210 and present comments to clients 210. Front end 510 may also determine to which one of processors 520-550 to send a request for comments. In other words, not all requests may be appropriate for all databases 420-450 and 470. For example, a request for comments relating to a particular business may not be appropriate for product reviews database 430 or news comments database 440. Similarly, a request for comments relating to a product may not be appropriate for business reviews database 420 or news comments database 440. In one implementation, front end 510 may include a table that identifies to which processor(s) 520-550 to send a particular request for comments. In another implementation, front end 510 may send all requests for comments to all, or a subset, of processors 520-550. Front end 510 may receive comments from one or more of processors 520-550 and format the comments for presentation to clients 210. In one implementation, front end 510 may format the comments so that the comments have the same, or approximately the same, visual format.

Business reviews processor 520 may receive requests from front end 510 and determine for which business to search for comments in business reviews database 420. In one implementation, business reviews processor 520 may maintain a mapping of document identifiers to the businesses that are referred to by the documents associated with the document identifiers. A request, received from front end 510, may include a document identifier. Based on this document identifier and the mapping, business reviews processor 520 may identify a business. Business reviews processor 520 may use information regarding this business, such as the name of the business, to conduct a search for comments in business reviews database 420. Business reviews processor 520 may provide the comments to front end 510.

Product reviews processor 530 may receive requests from front end 510 and determine for which product to search for comments in product reviews database 430. In one implementation, product reviews processor 530 may maintain a mapping of product identifiers to the products that are referred to by the documents associated with the product identifiers. A request, received from front end 510, may include a document identifier. Based on this document identifier and the mapping, product reviews processor 530 may identify a product. Product reviews processor 530 may use information regarding this product, such as the product identifier or the name of the product, to conduct a search for comments in product reviews database 430. Product reviews processor 530 may provide the comments to front end 510.

News comments processor 540 may receive requests from front end 510 and determine for which news item to search for comments in news comments database 440. In one implementation, news comments processor 540 may maintain a mapping of news items (e.g., topics, news articles, etc.) to the documents that relate to the news items. A request, received from front end 510, may include a document identifier. Based on this document identifier and the mapping, news comments processor 540 may identify a news item. News comments processor 540 may use information regarding this news item, such as topic information, author information, information regarding a news article, etc., to conduct a search for comments in news comments database 440. News comments processor 540 may provide the comments to front end 510.

Comments processor 550 may receive requests from front end 510 and determine for which document to search for comments in comments database 470. A request, received from front end 510, may include a document identifier. Based on this document identifier, comments processor 550 may search for comments for the document corresponding to the document identifier. Comments processor 550 may provide the comments to front end 510.

Returning to FIG. 4, business reviews database 420 may store comments regarding businesses. A comment regarding a particular business, in business reviews database 420, may include, for example, a user's remark(s) and/or opinion(s) regarding the business, such as operations of the business, service(s) provided by the business, product(s) provided by the business, trustworthiness of the business, or the like. The comments in business reviews database may be derived in different ways. For example, providers of yellow page listings may include comments regarding the provided business listings. Local search engines (i.e., search engines performing local searches, such as Google Local or Yahoo! Local) may accumulate and index comments regarding businesses in their indexes. Companies, such as the Better Business Bureau and various companies available on the web (e.g., ratethatcompany.com, glassdoor.com, etc.) may provide comments regarding various businesses. The comments stored in business reviews database 420 may be obtained from one or more of these sources, or the web sites of one or more of these sources may be crawled to obtain the comments. In one implementation, the comments stored in business reviews database 420 may be stored in a format such that the comments are searchable by the name of a business or by, for example, an identifier associated with that business.

Product reviews database 430 may store comments regarding products. A comment regarding a particular product, in product reviews database 430, may include, for example, a user's remark(s) and/or opinion(s) regarding the product, such as a feature of the product, a reliability of the product, a provider of the product (e.g., seller, manufacturer, etc.), or the like. The comments in product reviews database may be derived in different ways. For example, product search engines (e.g., Froogle, MySimon, ZDNet, ConsumerSearch, etc.) may accumulate and index comments regarding products in their indexes. Some companies available on the web (e.g., Epinions) accumulate comments regarding various products. Other companies available on the web (e.g., Amazon, Buy, etc.) sell products and permit their customers to submit comments regarding those products. The comments stored in product reviews database 430 may be obtained from one or more of these sources, or the web sites of one or more of these sources may be crawled to obtain the comments. In one implementation, the comments stored in product reviews database 430 may be stored in a format such that the comments are searchable by, for example, the name of a product or by an identifier associated with that product.

News comments database 440 may store comments regarding news items. A comment regarding a particular news item, in news comments database 440, may include, for example, a user's remark(s) and/or opinion(s) regarding a news topic, a news article, a provider of the news article (e.g., publisher, author, etc.), another news comment associated with the news item, an author of the other news comment, or the like. The comments in news comments database may be derived in different ways. For example, news search engines (e.g., Google News, Yahoo! News, etc.) may accumulate and index comments regarding news items in their indexes. Some news services available on the web (e.g., USAToday, The Washington Post, etc.) accumulate comments regarding various news items. The comments stored in news comments database 440 may be obtained from one or more of these sources, or the web sites of one or more of these sources may be crawled to obtain the comments. In one implementation, the comments stored in news comments database 440 may be stored in a format such that the comments are searchable by, for example, topic or by an identifier associated with a news article.

Blog database 450 may store comments contained in blog posts. A comment, in blog database 450, may include, for example, a user's remark(s) and/or opinion(s) contained within a blog. The topic of a blog post may relate to one or more of various topics, such as a web page, a product, a news item, a business, a movie, a particular food item, the contents of another blog post of the blog, an author of the blog or a blog post, or the like. The comments in blog database 450 may be derived in different ways. For example, a source of a blog site may provide the comments or the blogs site may be crawled to obtain the comments. In one implementation, the comments stored in blog database 450 may be stored in a format such that the comments are searchable by topic, author, or by an identifier associated with a document with which the comment is associated (e.g., a comment in a blog post may remark upon a particular document (e.g., web page) and may, therefore, be associated with that particular document).

Blog processor 460 may operate on the comments in blog database 450 and store the comments in comments database 470. In one implementation, blog processor 460 may operate on the contents of blog database 450 offline to identify blog posts that relate to documents and store these blog posts as comments in comments database 470. To identify blog posts that relate to documents, blog processor 460 may determine whether a particular blog post includes one or more links and analyze the links to identify the documents to which the links point. If the particular blog post includes a single link, then blog processor 460 may associate the blog post with the document pointed to by the link. If the particular blog post includes multiple links, then blog processor 460 may select one (or more) of the links and associate the blog post with the document pointed to by the selected link.

Comments database 470 may store comments regarding documents. A comment regarding a particular document, in comments database 470, may include, for example, a user's remark(s) and/or opinion(s) regarding a document, such as a topic of all or a portion of that document, an author or owner of that document, another comment regarding that document, or the like. The comments, in comments database 470, may be produced by clients 210, delivered to comments component 410, and stored in comments database 470 by comments component 410. As explained above, some of the comments, in comments database 470, may be derived from blog posts from blog database 450.

Comments database 420 may store information regarding comments. In one implementation, comments database 420 may include various fields that are separately searchable. Comments component 410 may search comments database 420 to identify comments associated with a particular author or a particular document.

Figure 6:
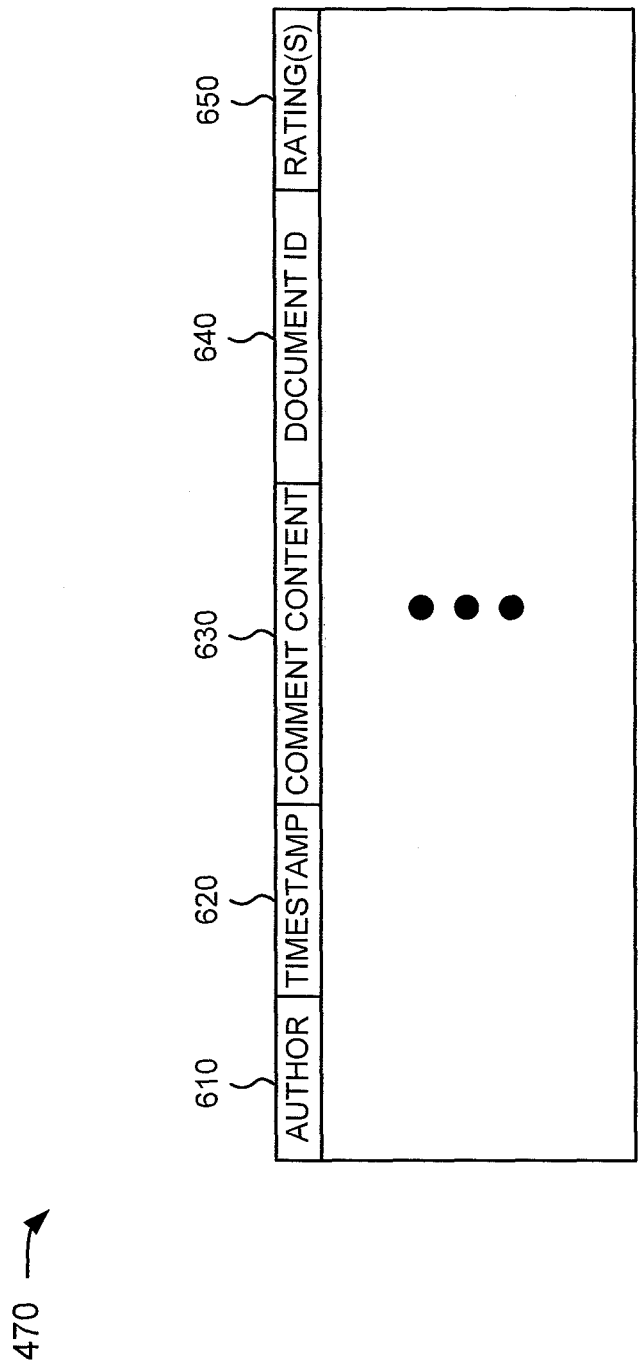
FIG. 6 is a diagram of exemplary fields that may be provided within the comments database of FIG. 4.

FIG. 6 is a diagram of exemplary fields that may be provided within comments database 420. As shown in FIG. 6, comments database 470 may include an author field 610, a timestamp field 620, a comment content 630, a document identifier field 640, and a rating(s) field 650. In other implementations, comments database 470 may include additional or fewer fields.

Author field 610 may store information regarding the author of the comment. For example, author field 610 may store the name of the author (e.g., actual name or online name), an image of the author, a graphic associated with the author, the name of a geographic location of the author, or other information regarding the author. Timestamp field 620 may store the date and/or time that the comment was created or modified. The date/time for timestamp field 620 may be generated by client 210 at which the comment was created or modified, or may be generated by server 220 based on a date/time at which the comment or modification is received from client 210. For a comment that has multiple revisions, timestamp field 620 may store the date and/or time that one or more, or all, of the revisions occurred.

Comment content field 630 may store the content of the comment. For example, the content of a comment may include text, video, image, and/or audio data. In one implementation, comment content field 630 may store the actual content of the comment. In another implementation, comment content field 630 may store a pointer to a storage location where the actual content of the comment is stored. Document identifier field 640 may store an address (e.g., a URL), or another type of unique identifier, for the document for which the comment was created.

Rating(s) field 570 may store a rating for the comment. A rating may be based on user feedback regarding the comment. For example, users may be permitted to rate a comment (favorably or unfavorably). These ratings may be used to determine whether and/or how to present the comment in connection with a particular document. In one implementation, a single rating may be maintained for a comment. That single rating may be used to determine whether and/or how to present the comment in connection with any document with which the comment has been associated. In another implementation, a separate rating may be maintained for each document (or for a group of documents) with which the comment has been associated. In this case, the rating, associated with a particular document, may be used to determine whether to present the comment with that particular document.

Returning to FIG. 4, in one implementation, blog processor 460 may store a blog post in comments database 470 so that the blog post resembles comments stored in comments database 470. In this situation, blog processor 460 may store the name of the blog containing the blog post or the name of the author of the blog post as the author of the comment (e.g., in author field 610), the date that the blog post was posted as the timestamp for the comment (e.g., in timestamp field 620), the content of the blog post as the content of the comment (e.g., in comment content field 630), and/or an identifier of the document to which the blog post points as the document identifier for the comment (e.g., in document identifier field 640).

Creating a Comment

Figure 7:
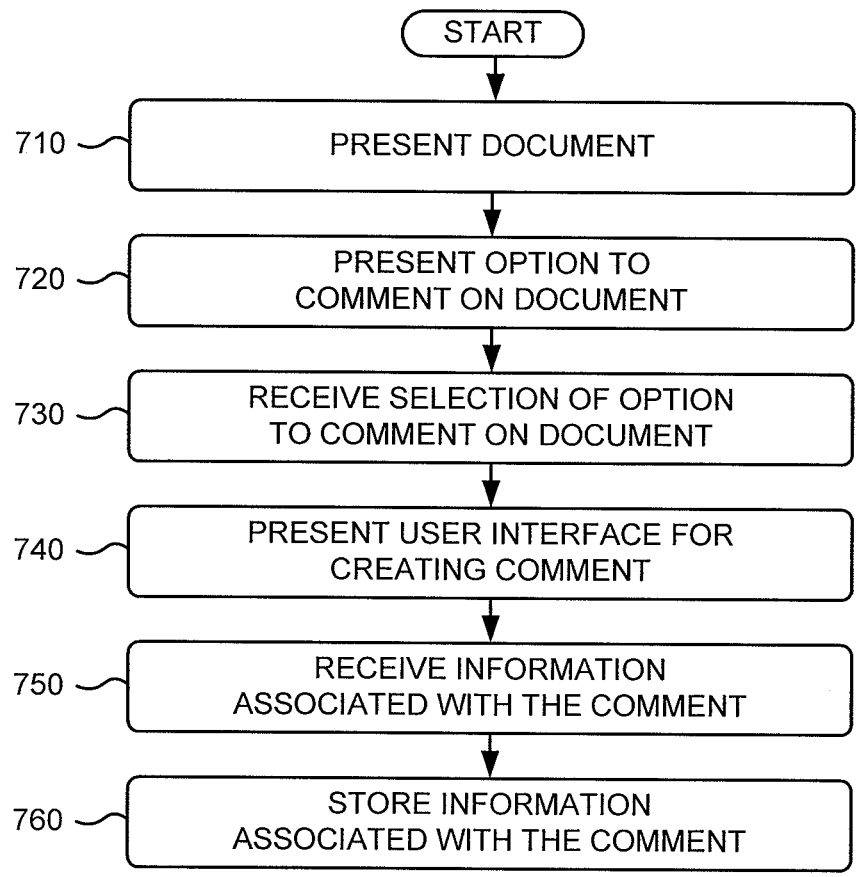
FIG. 7 is a flowchart of an exemplary process for creating a comment.

FIG. 7 is a flowchart of an exemplary process for creating a comment. In one implementation, the process of FIG. 7 may be performed by one or more components within client 210, server 220, or a combination of client 210 and server 220. In another implementation, the process may be performed by one or more components within another device or a group of devices separate from or including client 210 and/or server 220. Also, while FIG. 7 shows blocks in a particular order, the actual order may differ. For example, some blocks may be performed in parallel or in a different order than shown in FIG. 7.

The process of FIG. 7 may include presenting a document to a user of client 210 (block 710). For example, the user may access the document via a browser application operating on client 210. To obtain access to the document, for example, the user might enter an address (e.g., a URL) into the address field of the browser, the user might select a document from a list of documents (e.g., a list of favorites or bookmarks), or the user might perform a search using a search engine and select a search result corresponding to the document.

An option to provide a comment regarding the document may be presented (block 720). For example, the browser may include a user interface item (e.g., a button, a menu item, etc.) that may permit the user to turn on and turn off the commenting function provided by the browser. The user may select this user interface item to create a comment, to view a comment, and/or to remove a presented comment from view (e.g., hide the comment from view).

Figure 8:
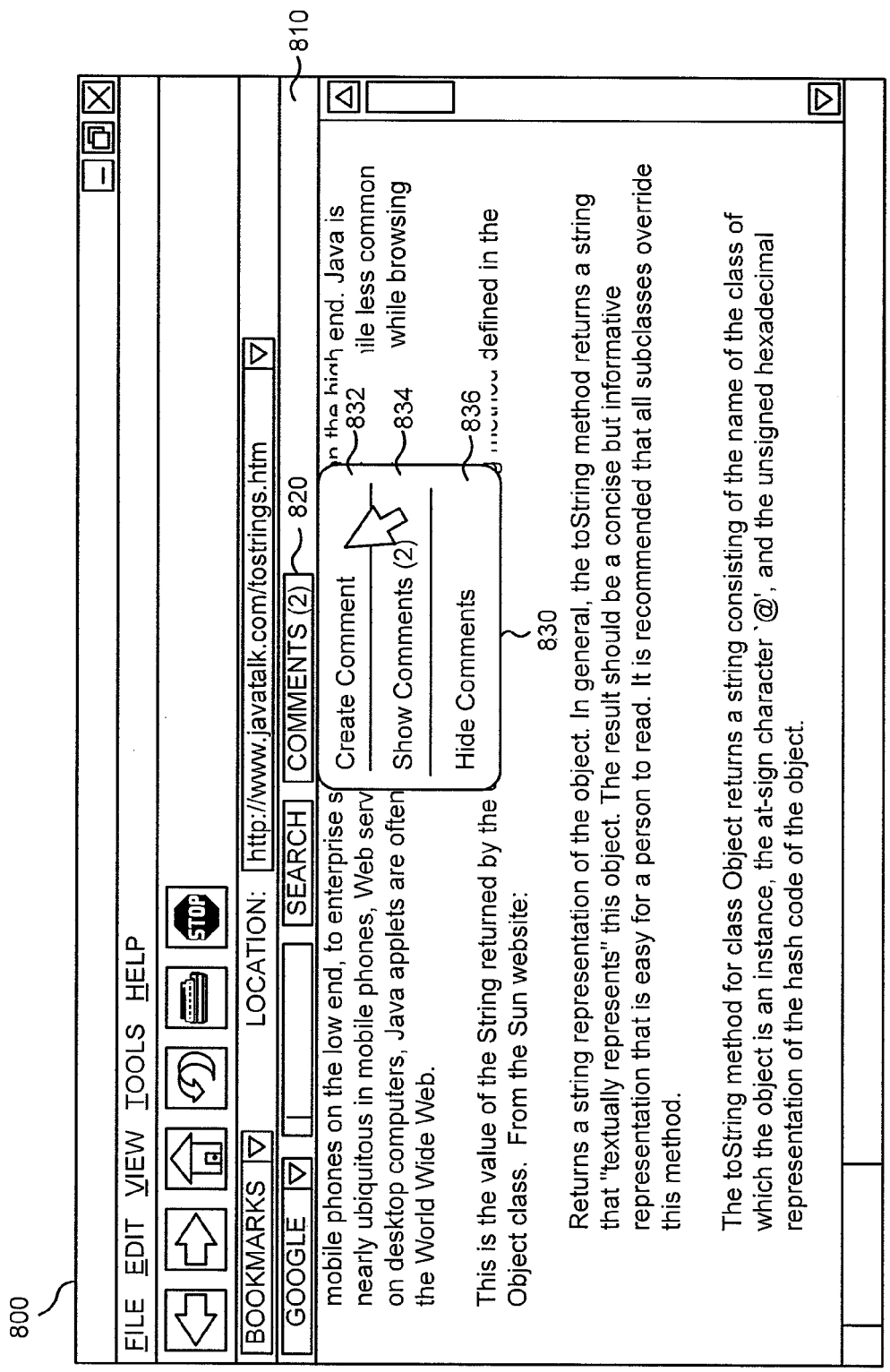
FIGS. 8 and 9 are diagrams of examples of creating a comment.

FIG. 8 is a diagram of an exemplary user interface that may be presented to a user to permit the user to activate the commenting function of the browser. As shown in FIG. 8, a browser window 800 may include an add-on toolbar 810 that includes a search box and a number of software buttons. In one implementation, toolbar 810 may include a comments button 820. Comments button 820 may optionally include information regarding the number of comments (shown as "(2)" in FIG. 8) that have been previously associated with the document that the user is currently accessing (shown in FIG. 8).

Comments button 820 may permit the user to turn on and off the commenting function. In one implementation, selection of comments button 820 may cause a menu 830 to be presented. Menu 830 may include a number of options including, for example, an option to create a comment 832, an option to show previously created comments 834, and an option to hide the comments 836. The user may select option 832 to generate a comment regarding the document that the user is currently accessing. The user may select option 834 to view a comment that was previously associated with the document that the user is currently accessing (e.g., FIG. 8 shows that two comments have been previously associated with the document). The user may select option 836 to remove any presented comments from view (e.g., hide the comments from view).

Returning to FIG. 7, selection of the option to provide a comment regarding the document may be received (block 730). For example, the user might activate the commenting feature. In one implementation, the user might activate the commenting feature by selecting an item from a menu or by selecting a button on a toolbar. As shown in FIG. 8, for example, the user may select comments button 820 on toolbar 810 within browser window 800.

A user interface may be presented to the user for creating the comment (block 740). For example, in response to receiving selection of comments button 720, the browser may present the user with a user interface via which the user may create a comment regarding the document. The content of the comment may be received (block 750). For example, the user may, via the user interface, input the content of the comment and/or insert a file as the content of the comment.

Figure 9:
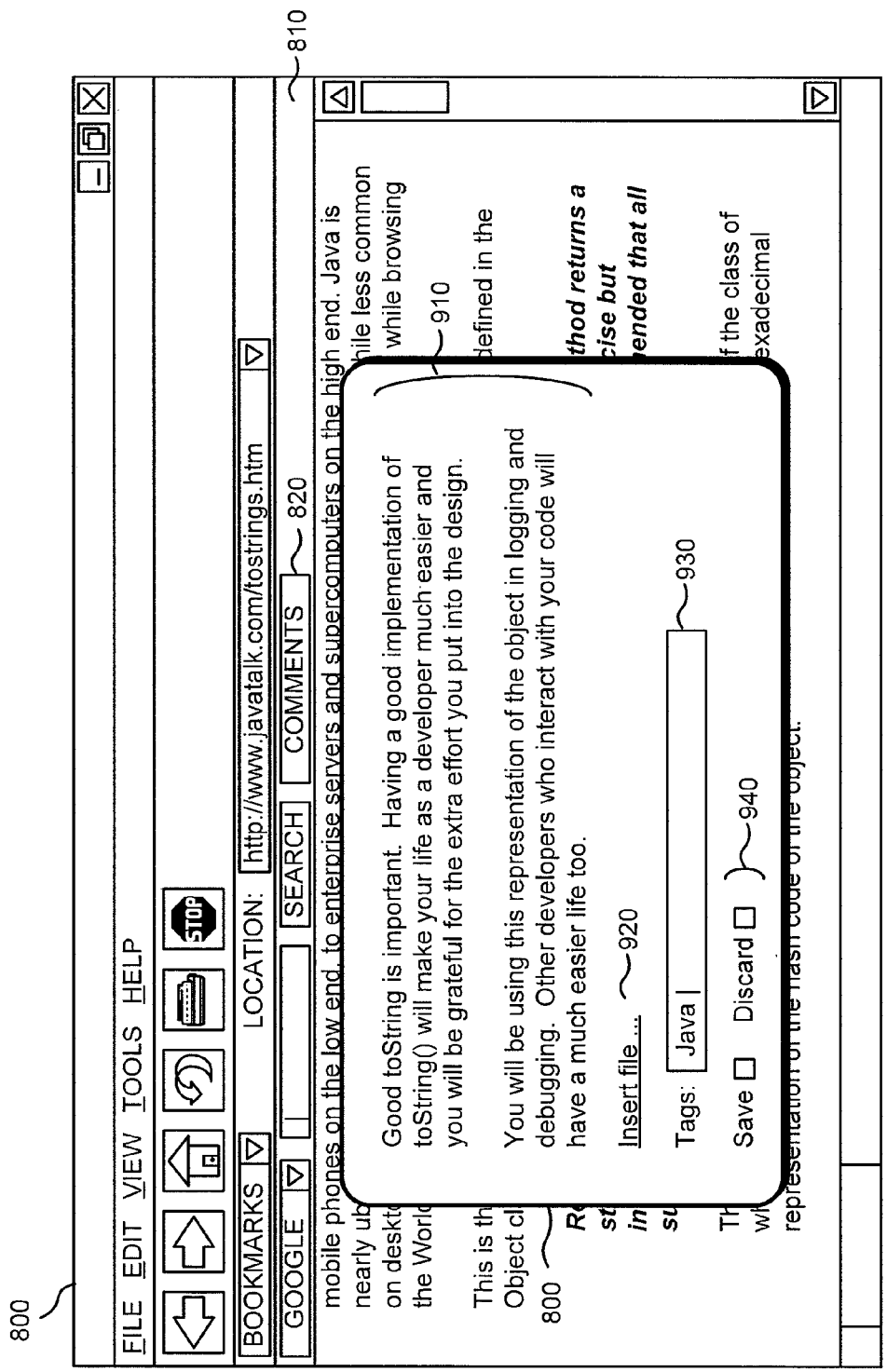

FIG. 9 is a diagram of an exemplary user interface that may be presented to a user to permit the user to create a comment. As shown in FIG. 9, browser window 800 may present a user interface 900 via which the user may enter the contents of the comment. User interface 900 may include input section 910, an option 920 to insert a file, a tags section 930, and save/discard options 940. Input section 910 may include an area into which the user may insert the contents of the comment (whether in the form of text, image data, video data, and/or audio data). Option 920 may permit the user to identify a file to be inserted into or attached to the comment. Tags section 930 may permit the user to identify keywords to associate with the comment. Save/discard options 940 may permit the user to select whether to save the comment or discard the comment without saving the comment.

Returning to FIG. 7, information associated with the comment may be stored (block 760). For example, the browser of client 210 may send information associated with the comment to comments component 410 of server 220. This information may include, for example, the name of the author of the comment (e.g., the user's name), a timestamp indicating the date and/or time that the comment was created, the content of the comment, and/or the document identifier for the document corresponding to the comment. Comments component 410 may create or update an entry in comments database 470 using this information.

Populating Comments Database with Blog Posts

Figure 10:
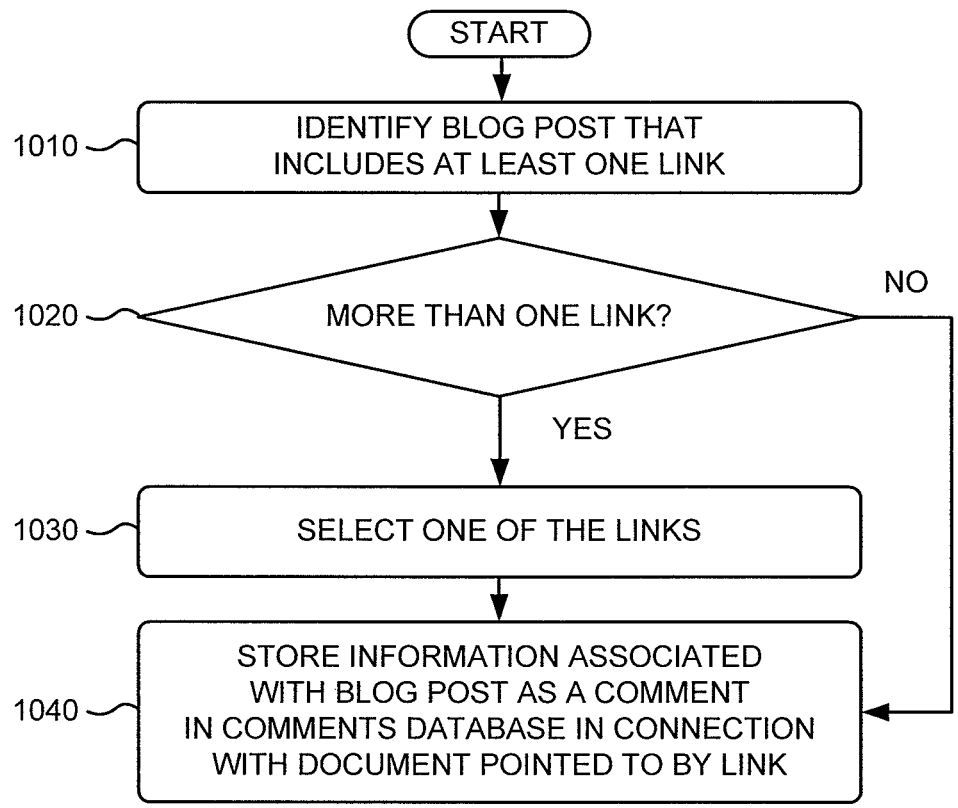
FIG. 10 is a flowchart of an exemplary process for populating the comments database of FIG. 4 with blog posts.

FIG. 10 is a flowchart of an exemplary process for populating comments database 470 with blog posts. In one implementation, the process of FIG. 10 may be performed by one or more components within server 220, client 210, or a combination of server 220 and client 210. In another implementation, the process may be performed by one or more components within another device or a group of devices separate from or including server 220 and/or client 210. Also, while FIG. 10 shows blocks in a particular order, the actual order may differ. For example, some blocks may be performed in parallel or in a different order than shown in FIG. 10.

The process of FIG. 10 may begin with the identification of a blog post that includes at least one link (block 1010). For example, blog processor 460 may analyze the blog posts in blog database 450 to identify a blog post that includes one or more links. Blog processor 460 may identify a link within a blog post by looking, for example, for a particular identifier (e.g., tag) within the code of the blog post.

It may be determined whether the blog post includes more than one link (block 1020). For example, blog processor 460 may analyze the contents of the blog post to identify the link(s) contained in the blog post. In one exemplary implementation, blog processor 460 may analyze the code of the blog post to identify tags that signify the presence of a link.

If the blog post includes more than one link (block 1020—YES), one of the links within the blog post may be selected (block 1030). The goal in this block is to select the link associated with the document about which the blog post contains remarks. In practice, a blog post may include multiple links and some of these links may be associated with documents unrelated to the remarks within the blog post. Therefore, blog processor 460 may select one of the links corresponding to a document about which the blog post may include remarks. In one implementation, blog processor 460 may use one or more factors to select one of the links.

For example, a click through rate associated with each of the links may be used as a factor to select one of the links included in a blog post. A click through rate for a link may be defined as the number of selections (e.g., clicks) that the link received divided by the number of impressions that the link received, or may be defined, more simply, as the number of selections that the link obtained. Blog processor 460 may obtain information regarding the click through rates from several different sources that can track users' activities anonymously or with the users' express permission. For example, blog processor 460 may obtain click through rates from an aggregator that may aggregate web feeds (e.g., Google Reader), from a browser add-on toolbar that may track a user's browser activity (e.g., Google Toolbar), from a traffic monitor that may generate statistics about visitors to web sites (e.g., Google Analytics), or from another source. In one implementation, blog processor 460 may use information regarding the click through rates to select one of the links. When a user selects a link in a blog post, the user may likely select the link that points to a document that is on topic with the blog post. By using the click through rates of the links to select one of the links, blog processor 460 may select the link leading to the document with content that best matches the content of the blog post.

Alternatively, or additionally, explicit user feedback may be used as a factor to select one of the links included in a blog post. When a blog post is presented to a user in connection with presentation of a particular document, the user may be given the opportunity to provide explicit feedback on that blog post. For example, the user may indicate whether the blog post is meaningful (e.g., a positive vote) or not meaningful (e.g., a negative vote) to the user (with respect to the particular document) by selecting an appropriate voting button. This kind of feedback may be used to select one of the links of the blog post. If users indicate, via appropriate voting, that a blog post is meaningful (or not meaningful) with regard to a particular document with which the blog post is presented, this may provide evidence that the blog post contains content relevant (or not relevant) to the content of the particular document. By using explicit user feedback to select one of the links, blog processor 460 may select the link leading to the document with content that best matches the content of the blog post.

Alternatively, or additionally, the length of the address (e.g., URL) associated with each of the links may be used as a factor to select one of the links included in a blog post. Authors often include, within blog posts, links to a homepage of a company or a web site. The remarks, within a blog post containing a link to a homepage, are often not about that homepage. A homepage typically includes a "short" address (e.g., an address including not much more than a domain name). Documents with longer addresses may be more useful and more likely to be on the same topic as the topic of the blog post than documents with shorter addresses. In one implementation, the length of the address associated with a link may influence whether that link is selected. By using information regarding the length of the addresses of the links to select one of the links, blog processor 460 may select the link leading to the document with content that best matches the content of the blog post.

Alternatively, or additionally, statistics regarding the documents pointed to by the links (e.g., a measure of popularity of the documents, such as a link-based score of the documents) may be used as a factor to select one of the links included in a blog post. Some popular documents (e.g., www.google.com) are linked to by a lot of blog posts. This reduces the chances that a particular blog post actually contains remarks regarding these popular documents. A popular document may be identified as a document with a measure of popularity (e.g., a link-based score) above a popularity threshold. Thus, in one implementation, the measure of popularity of a document associated with a link may influence whether that link is selected. Unpopular documents may be more useful and more likely to be on the same topic as the topic of the blog post than popular documents. By using information regarding the measure of popularity of the documents pointed to by the links to select one of the links, blog processor 460 may select the link leading to the document with content that best matches the content of the blog post.

Alternatively, or additionally, topic information, which may include a comparison of the topics of the documents, pointed to by the links in a blog post, to the topic of the blog post, may be used as a factor to select one of the links included in the blog post. The topic information may be derived using a technique that analyzes the words in a document to determine the topic(s) associated the document, analyzes the words in the blog post to determine the topic(s) associated with the blog post, and compares the topics to determine whether there is a match. Alternatively, the topic information may be derived using another technique. Thus, in one implementation, topic information may influence whether a link is selected. By using information, regarding a comparison of the topics of the documents pointed to by the links with the topic(s) of the blog post, to select one of the links, server 220 may select the link leading to the document with content that best matches the content of the blog post.

Thus, a link included in a blog post may be selected as a function of one or more factors. These one or more factors may include any of the factors identified above, whether taken alone or in combination with one or more other factors. This function may be represented as: F(f1, f2, . . . , fN), where N≥1, and where f# refers to a factor used by the function F. An example of a function that takes into account multiple ones of the factors identified above may be represented as: F(click through rate, user feedback, address length, document popularity, topic information). An example of a function that takes into account a single one of the factors identified above may be represented as: F(click through rate). In any event, the function may be used to generate a score for a link. A link may be selected based on its score (e.g., the link with the highest score may be selected for the comment).

A threshold may be used to assist in making the link selection. For example, blog processor 460 may select the link with the highest score if the highest score exceeds the threshold. If the highest score does not exceed the threshold, blog processor 460 may select none of the links of the blog post.

Alternatively, or additionally, a threshold may be used in a different way, such as to indicate whether to process the blog post at all. For example, blog processor 460 may process the blog post (e.g., to select a link) only if the scores for at least a subset of the links (or all of the links) exceed the threshold.

It may be possible for multiple links in a blog post to have similar scores (e.g., scores within a certain number or percentage of each other). Thus, it may be beneficial to select a highest scoring link when the score of the highest scoring link is different enough from the score of the next-highest scoring link. In one implementation, it may be determined whether there is at least a particular gap between the score of the highest scoring link and the score of the next-highest scoring link. For example, blog processor 460 may select the link with the highest score if there is at least the particular gap between the highest score and the next-highest score. If there is not at least the particular gap between the highest score and the next-highest score, blog processor 460 may select none of the links of the blog post.

If the blog post includes only one link (block 1020—NO) or if the blog post includes multiple links and one of the links is selected (block 1020—YES, and block 1030), information associated with the blog post may be stored as a comment in comments database 470 in connection with the document pointed to by the link (block 1040). For example, blog processor 460 may store the blog post, or information regarding the blog post in comments database 470 in association with the document. In one simple implementation, an entry may be created (or updated), in comments database 470, that identifies both the document and the blog post.

In one implementation, as described above, blog processor 460 may store a blog post in comments database 470 so that the blog post resembles comments stored in comments database 470. In this situation, blog processor 460 may store the name of the blog containing the blog post or the name of the author of the blog post as the author of the comment (e.g., in author field 610); blog processor 460 may store the date that the blog post was posted (or modified) as the timestamp for the comment (e.g., in timestamp field 620); blog processor 460 may store the content or a subset of the content of the blog post, or a link to the blog post or the blog containing the blog post, as the content of the comment (e.g., in comment content field 630); and/or blog processor 460 may store an identifier of the document to which the blog post points as the document identifier for the comment (e.g., in document identifier field 640).

While it has been described that blog processor 460 may select one of the links in the blog post, this need not be the case. In another implementation, blog processor 460 may select more than one of the links, and may associate the blog post (containing these links) with each of the documents pointed to by a corresponding one of the selected links. This might be beneficial in situations where two or more of the links in the blog post obtain high scores and perhaps these scores are different enough from the scores of the next-highest scoring links (as described above).

Figure 11:
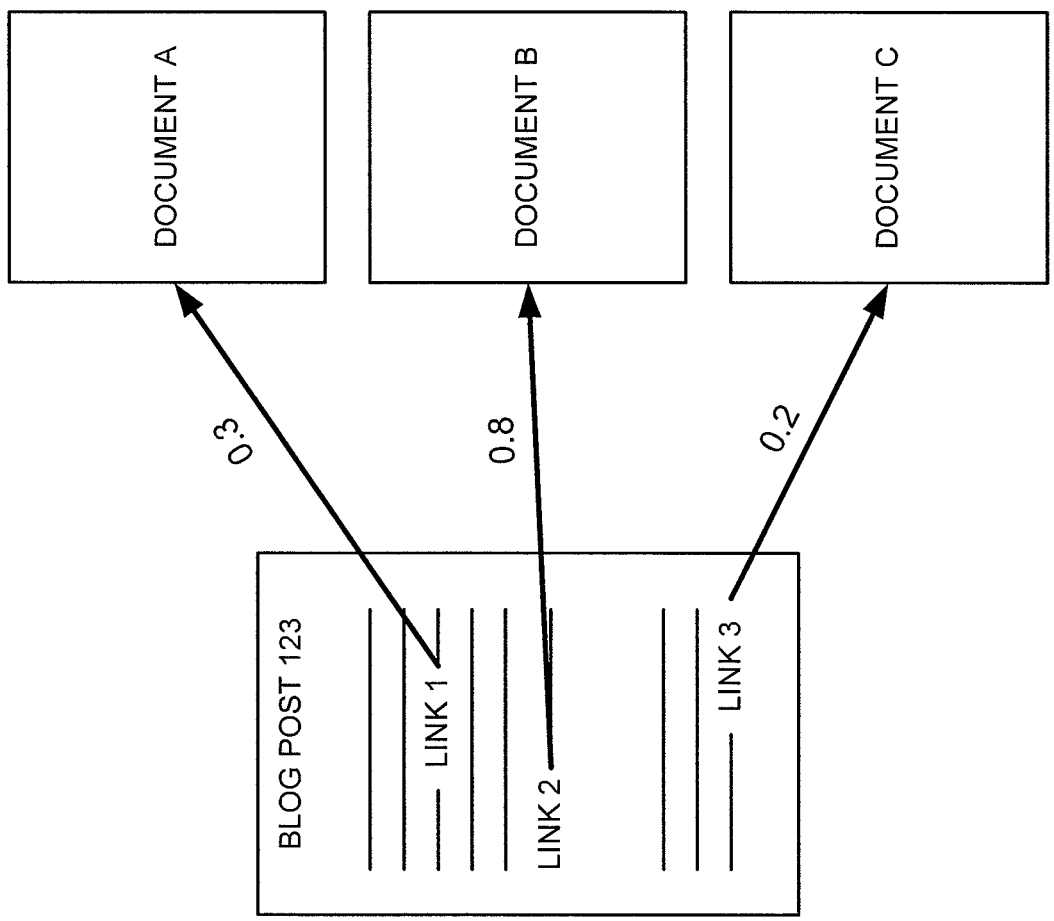
FIG. 11 is a diagram of an example of associating a blog post with a document.

FIG. 11 is a diagram of an example of a blog post with links to a number of documents. As shown in FIG. 11, a blog post (labeled as blog post 123) may include a number of links (labeled as link 1, link 2, and link 3). Assume that link 1 points to document A, link 2 points to document B, and link 3 points to document C. Scores may be generated for each of the links. As shown in FIG. 11, the score for link 1 is 0.3, the score for link 2 is 0.8, and the score for link 3 is 0.2. Thus, the score for link 2 is the highest score among the links. Therefore, link 2 may be selected for blog post 123. Blog post 123 may be associated with document B and this association may be stored in a memory, such as comments database 470.

Selecting Comment(s) to Present with a Document

Figure 12:
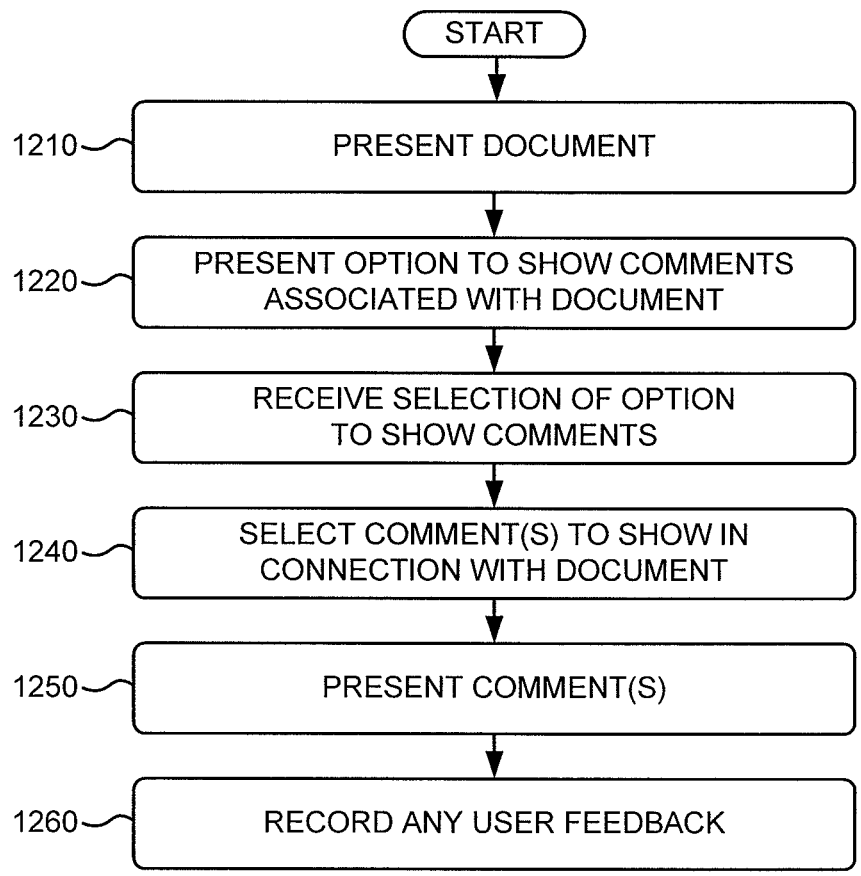
FIG. 12 is a flowchart of an exemplary process for presenting a comment in connection with a document.

FIG. 12 is a flowchart of an exemplary process for selecting a set of comments to present with a document. In one implementation, the process of FIG. 12 may be performed by one or more components within server 220, client 210, or a combination of server 220 and client 210. In another implementation, the process may be performed by one or more components within another device or a group of devices separate from or including server 220 and/or client 210. Also, while FIG. 12 shows blocks in a particular order, the actual order may differ. For example, some blocks may be performed in parallel or in a different order than shown in FIG. 12.

The process of FIG. 12 may include presenting a document to a user of client 210 (block 1210). For example, the user may request access to the document via a browser application operating on client 210. To request access to the document, for example, the user might enter an address (e.g., a URL) into the address field of the browser, the user might select a document from a list of documents (e.g., a list of favorites or bookmarks), or the user might perform a search using a search engine and select a search result corresponding to the document. In response to the user requesting access to the document, client 210 may send a request to a server that hosts the document and receive the document from that server.

An option to show comments associated with the document may be presented (block 1220). For example, the browser may include a user interface item (e.g., a button, a menu item, etc.) that may permit the user to turn on and turn off the commenting function provided by the browser. The user may select this user interface item to create a comment, to view a comment, and/or to remove a presented comment from view (e.g., hide the comment from view). In another implementation, the showing of comments regarding a document may occur automatically. For example, a comment, associated with a document, may be automatically shown when the comment has a score above a particular threshold. Exemplary techniques for scoring comments are described below. Thus, in this implementation, a comment that does not have a sufficient score may not be automatically shown.

Figure 13:
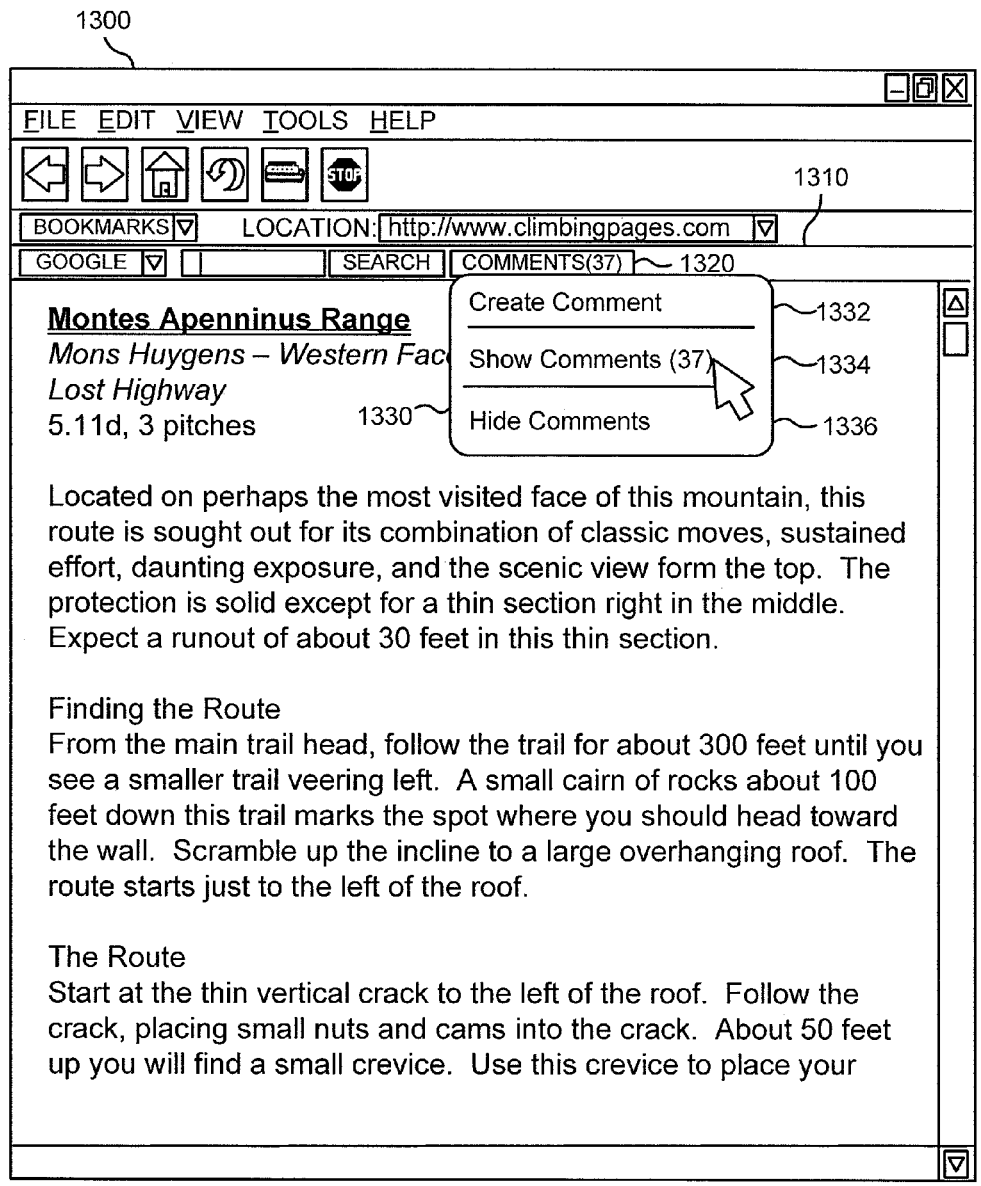
FIGS. 13-15 are diagrams of examples of presenting a comment.

FIG. 13 is a diagram of an exemplary user interface that may be presented to a user to permit the user to activate the commenting function of the browser. As shown in FIG. 13, a browser window 1300 may include an add-on toolbar 1310 that includes a search box and a number of software buttons. In one implementation, toolbar 1310 may include a comments button 1320. Comments button 1320 may optionally include information regarding the number of comments (shown as "(37)" in FIG. 13) that have been previously associated with the document that the user is currently accessing (shown as "www.climbingpages.com" in FIG. 13).

Comments button 1320 may permit the user to turn on and off the commenting function. In one implementation, selection of comments button 1320 may cause a menu 1330 to be presented. Menu 1330 may include a number of options including, for example, an option to create a comment 1332, an option to show previously created comments 1334, and an option to hide the comments 1336. The user may select option 1332 to generate a comment regarding the document that the user is currently accessing. The user may select option 1334 to view a comment that was previously associated with the document that the user is currently accessing (e.g., FIG. 13 shows that 37 comments have been previously associated with the document). The user may select option 1336 to remove any presented comments from view (e.g., hide the comments from view).

Returning to FIG. 12, selection of the option to provide a comment regarding the document may be received (block 1230). For example, the user might activate the commenting feature. In one implementation, the user might activate the commenting feature by selecting an item from a menu or by selecting a button on a toolbar. As shown in FIG. 13, for example, the user may select comments button 1320 on toolbar 1310 within browser window 1300, and/or may select option 1334 on menu 1330.

A comment(s) to show in connection with the document may be selected (block 1240). In one implementation, client 210 may send, to server 220, a request for comments associated with the document. For example, client 210 may send information regarding the document, such as an address of the document, to comments component 410. Comments component 410 may access one or more of databases 420-440 and/or 470 using, for example, the address of the document to retrieve the comments associated with the document.

As explained above, front end 510, for comments component 410, may determine to which one of processors 520-550 to send a request for comments. In other words, not all requests may be appropriate for all databases 420-440 and 470. Front end 510 may identify to which of processor(s) 520-550 to send the request for comments. In another implementation, front end 510 may send the request for comments to all, or a subset, of processors 520-550.

In the case of business reviews, business reviews processor 520 may receive the request from front end 510 and determine for which business to search for comments in business reviews database 420. The request, received from front end 510, may include a document identifier. Business reviews processor 520 may map the document identifier to the business (or businesses) that is referred to by the document associated with the document identifier, and perform a search of business reviews database 420 for comments associated with this business. In another implementation, an index of business reviews database 420 may be constructed that lists the comments associated with each business. The index may be constructed using existing indexing techniques. The constructed index may be used to search for one or more comments to provide in connection with the document. In yet another implementation, the index for business reviews database 420 may only include those comments having a score above a certain threshold. Exemplary techniques for scoring comments are described below. Business reviews processor 520 may provide the comments to front end 510.

In the case of product reviews, product reviews processor 530 may receive the request from front end 510 and determine for which product to search for comments in product reviews database 430. The request, received from front end 510, may include a document identifier. Product reviews processor 530 may map the document identifier to the product (or products) that is referred to by the document associated with the document identifier, and perform a search of product reviews database 430 for comments associated with this product. In another implementation, an index of product reviews database 430 may be constructed that lists the comments associated with each product. The index may be constructed using existing indexing techniques. The constructed index may be used to search for one or more comments to provide in connection with the document. In yet another implementation, the index for product reviews database 430 may only include those comments having a score above a certain threshold. Exemplary techniques for scoring comments are described below. Product reviews processor 530 may provide the comments to front end 510.

In the case of news comments, news comments processor 540 may receive the request from front end 510 and determine for which news item to search for comments in news comments database 440. The request, received from front end 510, may include a document identifier. News comments processor 540 may map the document identifier to the news item (or news items) that is referred to by the document associated with the document identifier, and perform a search of news comments database 440 for comments associated with this news item. In another implementation, an index of news comments database 440 may be constructed that lists the comments associated with each news item. The index may be constructed using existing indexing techniques. The constructed index may be used to search for one or more comments to provide in connection with the document. In yet another implementation, the index for news comments database 440 may only include those comments having a score above a certain threshold. Exemplary techniques for scoring comments are described below. News comments processor 540 may provide the comments to front end 510.

In the case of comments and/or blog posts, comments processor 550 may receive the request from front end 510 and search for comments, relating to the document, in comments database 470. The request, received from front end 510, may include a document identifier. Comments processor 550 may search comments database 470, based on the document identifier, to identify comments relating to the document associated with the document identifier. In another implementation, an index of comments database 470 may be constructed that lists the comments associated with each document. The index may be constructed using existing indexing techniques. The constructed index may be used to search for one or more comments to provide in connection with the document. In yet another implementation, the index for comments database 470 may only include those comments having a score above a certain threshold. Exemplary techniques for scoring comments are described below. Comments processor 550 may provide the comments to front end 510.

Of the comments received from database(s) 420, 430, 440, and/or 470, comments component 410 may select which comments to present and/or a manner for presenting the comments. In one implementation, comments component 410 may rank the comments in some manner. For example, comments component 410 may generate a score for each of the comments based on one or more factors associated with the comments. One factor for scoring a comment may include a rating of the comment. Explicit user feedback, in the form of a rating, may be obtained for various comments. A user may be permitted to provide a rating with regard to a comment presented in connection with a particular document. In one implementation, the rating may indicate whether the user found the comment useful (positive rating) or not useful (negative rating) in connection with the particular document. In another implementation, the rating may indicate a degree of usefulness, such as a rating from 1 to 5. Not all user ratings need to be treated equally. For example, ratings from users may be weighted in some manner based on profiles of the users and/or a history of how the users' rating behavior has been in the past (e.g., how a user's past ratings compared to other users' ratings with regard to a particular comment or a particular set of comments).

Comments component 410 may obtain the rating of a comment from rating(s) field 670 in comments database 470 (and possibly also available for comments in databases 420-440). Comments component 410 may use the rating factor to score a comment and use the score of a comment to determine whether to present that comment (e.g., present only comments with scores above a threshold) and/or a manner in which to present the comments (e.g., present comments in an order based on their scores). By using a rating to score a comment, comments in which users are interested (e.g., that users find useful) may be presented in connection with a document before or, instead of, comments in which users are not interested (e.g., that users did not find useful).

Another factor for scoring a comment may include a rank of an author of the comment. The author of a comment may be ranked based on one or more factors, such as the quantity of comments created by the author, a user feedback rating associated with the author (e.g., users might provide feedback regarding comments created by a particular author and this information may be used to rate the author), or whether the author is the user (e.g., users are typically interested in being presented with their own comments). Comments component 410 may use the author ranking factor to score a comment and use the score of the comment to determine whether to present that comment (e.g., present only comments with scores above a threshold) and/or a manner in which to present the comments (e.g., present comments in an order based on their scores). The rank of an author may reflect the quality of the comment created by that author. Thus, by using an author ranking to score a comment, comments associated with higher ranked authors may be presented over comments associated with lower ranked authors.

Yet another factor for scoring a comment may include a timestamp associated with the comment. Comments component 410 may obtain the timestamp from timestamp field 620 in comments database 470 (and possibly also available for comments in databases 420-440). Comments component 410 may use the timestamp factor to score a comment and use the score of the comment to determine whether to present that comment (e.g., present only comments with scores above a threshold) and/or a manner in which to present the comments (e.g., present comments in an order based on their scores). More recent timestamps may reflect fresh, more relevant comments, and less recent timestamps may reflect stale, less relevant comments. In the case of comments with revisions, timestamps reflecting comments with more modifications may infer more relevant comments than comments with fewer modifications. Thus, by using a timestamp to score a comment, comments that are more recent (or that have more modifications), and thus, potentially more relevant, may be presented over comments that are older (or that have fewer modifications), and potentially less relevant.

A further factor for scoring a comment may be based on a determination of how likely a particular one of databases 420-440 or 470 is to have comments relevant to the document requested or accessed by client 210. For example, comments component 410 may determine, based on a particular document being requested or accessed by client 210, a probability score that reflects a measure of relevance of each of databases 420-440 or 470. Comments component 410 may make this determination based on information that comments component 410 obtains about the document being requested or accessed by client 210. Thus, by using a probability score of databases 420-440 and 470 to score a comment, comments that are obtained from a higher scoring database 420-440 or 470 (thus, potentially more relevant to the document for which the comment is to be presented) may be presented over comments that are associated with a lower scoring database 420-440 or 470 (thus, potentially less relevant to the document for which the comment is to be presented).

Another factor for scoring a comment may be based on the language used in the comment. Different language signals may be used, such as whether the comment text is in English (or a language of the user), whether proper grammar is used, whether formal words (versus slang) are used, whether proper capitalization (as opposed to all capital letters) is used, etc. One or more of these signals may be used to generate a score for the comment. For example, comments not in English, comments using improper grammar, comments using slang, and/or comments using improper capitalization may not be meaningful to a user. By analyzing the language used in a comment and using a result of this analysis to score the comment, comments component 410 may improve a user's experience by presenting meaningful comments in connection with the particular document.

A further factor for scoring a comment may be based on the document from which the comment originated. Systems may exist for ranking documents that contain comments. The ranking of a document that contains a comment may be used to generate a score for the comment. Some documents may be known to include high quality comments. These documents may be ranked accordingly. By using the ranking of a document that contains a comment to score the comment, comments component 410 may provide higher quality comments in connection with the particular document.

Alternatively, or additionally, implicit user feedback may be used as a factor to generate a score for a comment. For example, certain signals may reflect a user's interest or disinterest in a comment. These signals may include information regarding the amount of time that a user kept a comment open, whether the user requested the entire comment or requested access to a document containing the comment, information regarding the amount of time that a user spent accessing the comment or a document containing the comment, etc. One or more of these signals may be used to generate a score for the comment. If users indicate, via their behavior, that a comment is meaningful (or not meaningful) to them with regard to a particular document with which the comment is presented, this may provide evidence that the comment contains content relevant (or not relevant) to the content of the particular document. By using the implicit user feedback to generate a score for a comment, comments component 410 may assure that comments with content that best matches the content of the particular document are presented in connection with the particular document.

Comments component 410 may use one or more of the above-identified factors, and/or other factors, in scoring the comments associated with the document. Comments component 410 may select one or more of the comments based on the scores of the comments. For example, comments component 410 may select comments with scores above a threshold. Alternatively, or additionally, comments component 410 may select a number of highest scoring comments.

The selected comment(s) may be presented (block 1250). For example, comments component 410 may use the scores of the selected comment(s) to determine a manner for presenting the selected comment(s). In one implementation, comments component 410 may order the selected comment(s) based on their scores.

Comments component 410 may format the comments to a particular format so that comments from one database 420-440 or 470 exactly, or approximately, matches comments from another database 420-440 or 470. Comments component 410 may send the selected comment(s) to client 210 for presentation by the browser of client 210. In one implementation, the browser may present one or more of the comments within the browser window in which the document is presented. In another implementation, the browser may present one or more of the comments within a window separate from the window in which the document is presented. In yet another implementation, the browser may create a frame (e.g., a regular frame or iframe) and insert information regarding one or more comments in the frame. In a further implementation, the browser may use another mechanism for presenting one or more of the comments.

Figure 14:
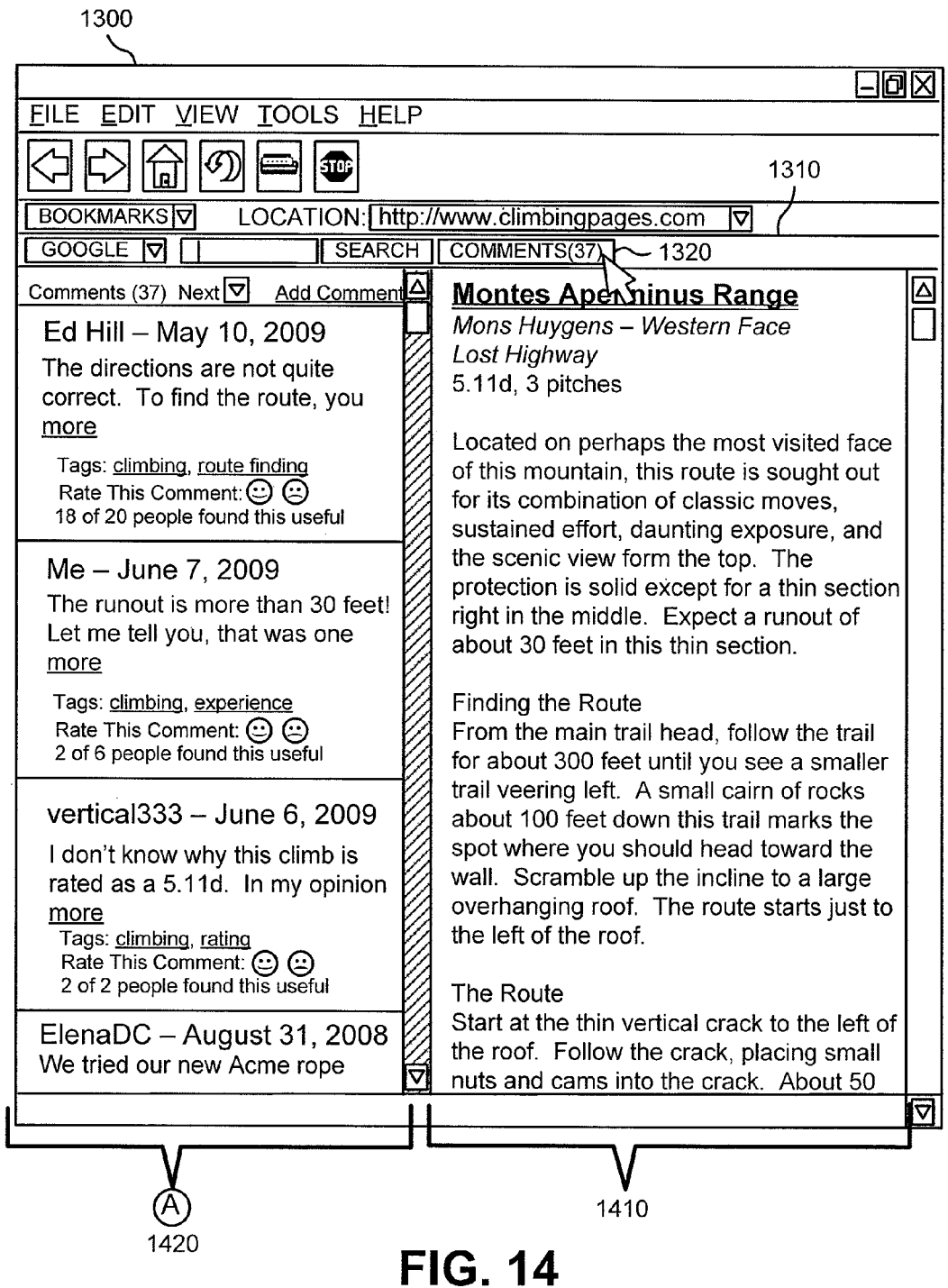
Figure 15:
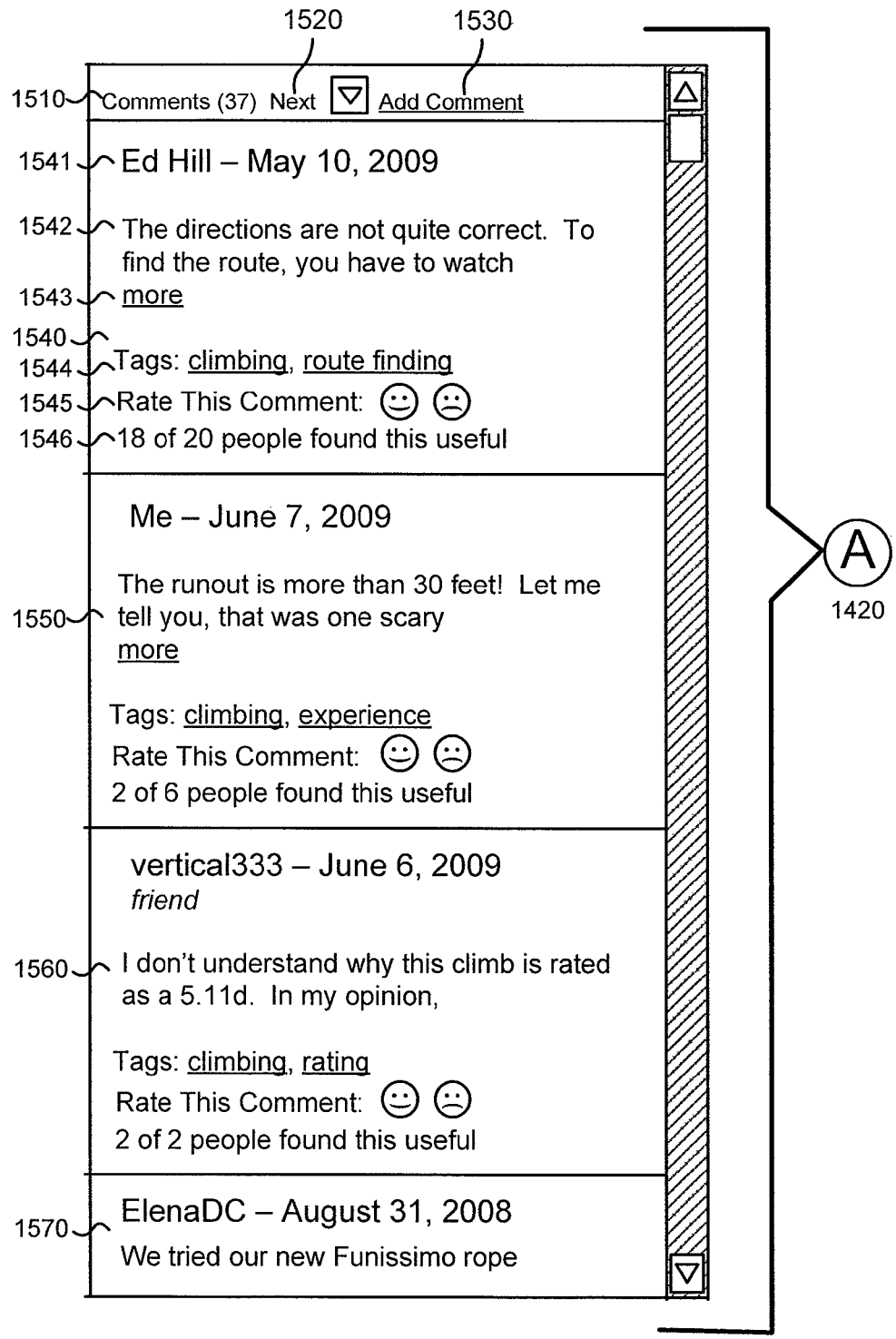

FIGS. 14 and 15 are diagrams of an exemplary user interface via which a comment may be presented. As shown in FIG. 14, browser window 1300 may include a document section 1410 and a comments section 1420. Document section 1410 may include the content of the document that the user is currently accessing. Comments section 1420 may include the content of one or more comments.

As shown in FIG. 15, comments section 1420 may include a number of comments indication 1510, a "next" button 1520, an "add comment" button 1530, and one or more comments 1540, 1550, 1560, and 1570. In the example of FIG. 15, four comments are displayed. Number of comments indication 1510 may display how many comments are available for the document (shown as "37" in FIG. 15). "Next" button 1520 may provide a function for scrolling down to the next group of comments when a user clicks on "next" button 1520. A "previous" button (not shown) may also be provided for scrolling up to the previous collection of comments when the user clicks on the "previous" button. "Add comments" button 1530 may allow a user to add a comment to the document. For example, when a user clicks on "add comment" button 1530, a new window may appear, allowing a user to enter text and other information to create a new comment.

An individual comment may include author and date information 1541, comment content 1542, "more" button 1543, topic tags 1544, rating option 1545, and rating indication 1546. Author and date information 1541 may include information about the author of the comment and the date and/or time on which the comment was created. As shown in FIG. 15, the author information may include a name of the author who created the comment. Comment content 1442 may include text, image data, audio data, and/or video data that the author added to the comment. Only a portion of comment content 1542 may be visible in comments section 1410 so that other comments may be displayed at the same time. An individual comment may include "more" button 1543. When a user clicks on "more" button 1543, the window of the individual comment may expand to display the full contents of the individual comment.

An individual comment may include tags 1544 that indicate topics associated with the comment. Tags 1544 may be clickable. When a user clicks on a tag, comments that are displayed in comments section 1420 may be changed to comments that include the tag that was clicked. In the example of FIG. 15, if a user clicks on the "route finding" tag of comment 1540, comments that are displayed may be changed to comments that include a "route finding" tag. This may allow a user to see comments associated with a particular topic.

An individual comment may include rating option 1545 to provide a rating for the comment. In this example, the rating can be a favorable or unfavorable rating. By clicking on a particular rating identifier (smiley face for favorable rating and frowning face for unfavorable rating), the user may indicate what rating the user is giving for the comment. Rating indication 1546 may indicate how many users found the comment useful. In this example, a user may be considered to have found a comment useful if the user gave the comment a favorable rating.

Comments presented in comment section 1420 may be presented in an order of ranking based on information received from comments component 410. For example, comments component 410 may specify the order for presenting the comments. The size of the individual comments that are displayed in comments section 1420 may be adjustable by dragging, with a pointing device, such as a mouse or a stylus, a line that separates two comments or separates comments section 1420 from document section 1410.

Conclusion

Implementations, described herein, may select comments from various sources to provide in connection with a document. These sources may be broadly classified into two groups: (1) comments received from users via commenting functionality associated with a browser installed on a client device; and (2) comments obtained independent of commenting functionality associated with a browser installed on a client device, such as comments received via a server-provided form, via e-mail, from blogs, etc. The selected comments may relate to the content of the document and, thus, provide useful information to a user who is accessing that document.

The foregoing description provides illustration and description, but is not intended to be exhaustive or to limit the invention to the precise form disclosed. Modifications and variations are possible in light of the above teachings or may be acquired from practice of the invention.

For example, while particular functional components have been described with regard to FIG. 4, these functional blocks might differ in another implementation. For example, in one implementation, comments component 410 may connect to comments database 470. Business reviews database 420, product reviews database 430, and news comments database 440 may connect to comments database 470 via respective processors (like blog database 450 connecting to comments database 470 via blog processor 460 in FIG. 4). These processors may operate offline in a manner similar to blog processor 460, as described above. Thus, for example, a business processor may process the comments in business reviews database 420 to store the comments in comments database 470 so that the comments match, or approximately match, the other comments in comments database 470; a product processor may process the comments in product reviews database 430 to store the comments in comments database 470 so that the comments match, or approximately match, the other comments in comments database 470; and a news processor may process the comments in news comments database 440 to store the comments in comments database 470 so that the comments match, or approximately match, the other comments in comments database 470. Thereafter, when a request for comments is received by comments component 410, comments component 410 may retrieve the comments from comments database 470 and send the comments to a requesting client 210.

Further, it has been described that selection of a button on a toolbar (or within a browser window) may cause a client 210 to request comments to present in connection with a document being accessed by client 210. In another implementation, this process may be automatically performed whenever client 210 requests access to a document. In other words, whenever client 210 requests access to a document, client 210 may automatically send a request, to server 220, for comments relevant to the document.

Also, while series of blocks have been described with regard to FIGS. 7, 10, and 12, the order of the blocks may be modified in other implementations. Further, non-dependent blocks may be performed in parallel.

Further, exemplary graphical user interfaces have been described with respect to FIGS. 8, 9, and 13-15. In other implementations, the graphical user interfaces may include more, fewer, or different pieces of information.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor that transforms the general purpose processor to a special-purpose processor that functions according to the exemplary processes described above).

Further, it has been described that scores are generated for links and/or comments. The scoring scheme has been described where higher scores are better than lower scores. This need not be the case. In another implementation, the scoring scheme may be switched to one in which lower scores are better than higher scores.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method performed by one or more server devices, the method comprising:
    providing, using a processor of the one or more server devices, a plurality of data structures, associated with the one or more server devices, that store a plurality of comments,
    the plurality of comments including comments of different types,
    a first comment, of the plurality of comments, being included in a first document of a plurality of documents, and
    a second comment, of the plurality of comments, being included in a second document of the plurality of documents;

receiving, via a processor of the one or more server devices, a request for comments relating to a third document that is different from the first document and the second document;

searching, using a processor of the one or more server devices, one or more of the plurality of data structures to identify comments relating to the third document,
the identified comments including at least one of the first comment or the second comment;

generating, using a processor of the one or more server devices, a score for each comment of the identified comments,
the score for each comment, of the identified comments, being generated based on a combination of at least three of:
user feedback with regard to the comment,
a rank of an author of the comment,
a date or time at which the comment was created or modified,
a measure of relevance of a data structure, of the plurality of data structures, that stores the comment,
a language used in the comment, or
a rank of a respective document, of the plurality of documents, that includes the comment;

determining, using a processor of the one or more server devices, whether to provide each comment of the identified comments to a client device based on the score generated for each comment of the identified comments; and providing, using a processor of the one or more server devices, one or more of the identified comments to the client device for presentation in connection with the third document based on determining whether to provide each comment of the identified comments.

2. The method of claim 1, where, for the first comment, one of the plurality of data structures stores information including at least one of:
information regarding the author of the first comment,
the date or time at which the first comment was created or modified,
a content of the first comment, or
an identifier associated with the first document.

3. The method of claim 1, where the plurality of comments includes at least two of:
comments regarding web pages,
comments contained in blog posts,
comments regarding news items,
comments with reviews of products, or
comments with reviews of businesses.

4. The method of claim 3, where the comments regarding web pages are stored in a first one of the plurality of data structures,
where the comments contained in blog posts are stored in a second one of the plurality of data structures,
where the comments regarding news items are stored in a third one of the plurality of data structures,
where the comments with reviews of products are stored in a fourth one of the plurality of data structures, and
where the comments with reviews of businesses are stored in a fifth one of the plurality of data structures.

5. The method of claim 3, further comprising:
performing offline processing to store, in a particular one of the plurality of data structures, at least one of:
the comments contained in blog posts,
the comments regarding news items,
the comments with reviews of products, or
the comments with reviews of businesses,
where the offline processing occurs independent of the request for comments.

6. The method of claim 5, where searching the one or more of the plurality of data structures includes searching the particular one of the plurality of data structures, to identify at least one of the first comment or the second comment, after storing the at least one of the comments contained in blog posts, the comments regarding news items, the comments with reviews of products, or the comments with reviews of businesses in the particular one of the data structures.

7. The method of claim 1, where the request for comments includes a document identifier associated with the third document, and
where searching the one or more of the plurality of data structures includes:
identifying a particular product based on the document identifier, and
searching one of the plurality of data structures to identify the at least one of the first comment or the second comment,
the at least one of the first comment or the second comment relating to the particular product.

8. The method of claim 1, where the request for comments includes a document identifier associated with the third document, and
where searching the one or more of the plurality of data structures includes:
identifying a particular business based on the document identifier, and
searching one of the plurality of data structures to identify the at least one of the first comment or the second comment,
the at least one of the first comment or the second comment relating to the particular business.

9. The method of claim 1, where the request for comments includes a document identifier associated with the third document, and
where searching the one or more of the plurality of data structures includes:
identifying a particular news item based on the document identifier, and
searching one of the plurality of data structures to identify the at least one of the first comment or the second comment,
the at least one of the first comment or the second comment relating to the particular news item.

10. The method of claim 1, where searching the one or more of the plurality of data structures includes:
selecting, based on information included in the request for comments, a data structure of the plurality of data structures, and
searching the selected data structure for comments relating to the third document.

11. The method of claim 1, where searching the one or more of the plurality of data structures includes:
searching a subset of the plurality of data structures for comments relating to the third document,
where the subset includes at least two and fewer than all of the plurality of data structures.

12. The method of claim 1, where generating the score for each comment of the identified comments includes:
generating the score for at least one of the identified comments based on a combination of four or more of:
the user feedback with regard to the at least one of the identified comments, the rank of an author of the at least one of the identified comments, the date or time at which the at least one of the identified comments was created or modified, the measure of relevance of the data structure that stores the at least one of the identified comments, the language used in the at least one of the identified comments, or the rank of the respective document, of the plurality of documents, that includes the at least one of the identified comments.

13. The method of claim 1, further comprising:

ordering the identified comments for presentation based on the score generated for each comment of the identified comments.

14. The method of claim 1, where the third document is provided in a particular browser window of the client device, and where providing the identified comments includes providing the identified comments for presentation, within the particular browser window of the client device, concurrently with the third document.

15. A non-transitory computer-readable medium storing instructions, the instructions comprising:

one or more instructions which, when executed by one or more processors, cause the one or more processors to:

store, in a first data structure, comments relating to documents, the comments in the first data structure originating from a first source;

store, in a second data structure, comments relating to documents, the comments in the second data structure originating from a second source, the first source being different from the second source;

receive a request for comments relating to a particular document, the particular document originating from a third source that is different than the first source and the second source, and information regarding the particular document not being stored in the first data structure or the second data structure;

search at least one of the first data structure or the second data structure to identify comments relating to the particular document;

generate a score for each comment, of the identified comments, to obtain generated scores, the score for each comment, of the identified comments, being generated based on a combination of at least three of:

user feedback with regard to the comment, a rank of an author of the comment, a date or time at which the comment was created or modified, a measure of relevance of one of the first data structure or the second data structure that stores the comment, a language used in the comment, or a rank of a document that includes the comment;

determine a group of the identified comments based on the generated scores;

format the group of the identified comments to correspond to a particular format; and provide, to a client device, the group of the identified comments for presentation in connection with the particular document, the group of the identified comments being provided in the particular format.

16. The computer-readable medium of claim 15, where the instructions further comprise:

one or more instructions to perform offline processing to store, in the second data structure, the comments originating from the second source, where the offline processing occurs independent of receiving the request for comments, and where the one or more instructions to search the at least one of the first data structure or the second data structure include:

one or more instructions to search the second data structure after storing the comments, originating from the second source, in the second data structure.

17. The computer-readable medium of claim 15, where the one or more instructions to generate the score for each comment of the identified comments include:

one or more instructions to generate the score for at least one of the identified comments based on a combination of four or more of:

the user feedback with regard to the at least one of the identified comments, the rank of the author of the at least one of the identified comments, the date or time at which the at least one of the identified comments was created or modified, the measure of relevance of one of the first data structure or the second structure that stores the at least one of the identified comments, the language used in the at least one of the identified comments, or the rank of the document that includes the at least one of the identified comments.

18. The computer-readable medium of claim 15, where the instructions further comprise:

one or more instructions to order the identified comments based on the generated scores.

19. The computer-readable medium of claim 15, where the comments originating from the first source include comments received from users via a commenting functionality associated with browsers installed on client devices, and where the comments from the second source include comments received from users independent of the commenting functionality.

20. A system, comprising:

one or more memory devices including one or more data structures to store comments relating to documents, the comments including first comments originating from a first source and second comments originating from a second source, the first comments including comments received from users via a commenting functionality associated with browsers installed on client devices of the users, and the second comments including comments obtained independent of the commenting functionality; and one or more server devices, including one or more processors, to:

receive a request for comments relating to a particular document, the particular document originating from a third source that is different from the first source and the second source, and information regarding the particular document not being stored in the one or more data structures,
search at least one of the one or more data structures to identify comments relating to the particular document,
generate a score for each comment of the identified comments,
   the score for each comment, of the identified comments, being generated based on a combination of at least three of:
      user feedback with regard to the comment,
      a rank of an author of the comment,
      a date or time at which the comment was created or modified,
      a measure of relevance of one of the one or more data structures that stores the comment,
      a language used in the comment, or
      a rank of a document that includes the comment,
determine whether to provide each comment of the identified comments based on the score generated for the comment,
determine a group of the identified comments based on determining whether to provide each comment of the identified comments, and
provide the group of the identified comments for presentation in connection with the particular document.

21. The system of claim 20, where, when generating the score for each comment of the identified comments, the one or more server devices are to:
generate the score for at least one of the identified comments based on a combination of four or more of:
   the user feedback with regard to the at least one of the identified comments,
   the rank of the author of the at least one of the identified comments,
   the date or time at which the at least one of the identified comments was created or modified,
   the measure of relevance of one of the one or more data structures that stores the at least one of the identified comments,
   the language used in the at least one of the identified comments, or
   the rank of the document that includes the at least one of the identified comments.

\* \* \* \* \*